US012705164B2

(12) United States Patent
Gaitonde et al.

(10) Patent No.: US 12,705,164 B2
(45) Date of Patent: Aug. 11, 2026

(54) ARTIFICIAL-INTELLIGENCE MODELING UTILITY SYSTEM

(71) Applicant: Microsoft Technology Licensing, LLC, Redmond, WA (US)

(72) Inventors: Vikram D. Gaitonde, Sunnyvale, CA (US); Peter Michael Humke, Pearland, TX (US); Michael E. Pascual, Santa Clara, CA (US); Smriti R. Ramakrishnan, Belmont, CA (US); Ajith Muralidharan, Sunnyvale, CA (US); Yao Pan, Mountain View, CA (US); Lingjie Weng, Sunnyvale, CA (US); Keren Wang, Santa Clara, CA (US); Anjian Wu, Newark, CA (US); Daniel Chi Peng Lau, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 208 days.

(21) Appl. No.: 18/388,758

(22) Filed: Nov. 10, 2023

(65) Prior Publication Data

US 2025/0004931 A1 Jan. 2, 2025

Related U.S. Application Data

(63) Continuation-in-part of application No. 18/216,042, filed on Jun. 29, 2023.

(51) Int. Cl.
*G06F 11/36* (2025.01)
*G06F 11/3668* (2025.01)

(52) U.S. Cl.
CPC ...... *G06F 11/3688* (2013.01); *G06F 11/3684* (2013.01)

(58) Field of Classification Search
CPC .. G06F 11/3684; G06F 11/3688; G06F 9/451; G06N 20/00
See application file for complete search history.

(56) References Cited

U.S. PATENT DOCUMENTS 10,417,577 B2 9/2019 Bowers et al.
10,552,002 B1 2/2020 Maclean et al.
(Continued)

OTHER PUBLICATIONS

"Mozilla", MDN Mozilla, Retrieved from URL:https://devdoc.net/web/developer.mozilla.org/en-US/docs/Mozilla/, Retrieved Dated Mar. 23, 2026, 14 Pages.
(Continued)

*Primary Examiner* — Hanh Thi-Minh Bui
(74) *Attorney, Agent, or Firm* — Cantor Colburn LLP; Renee D. Brown

(57) ABSTRACT

Systems and methods are directed to providing multilevel chained testing. A modeling manager receives a request for data associated with an experience having multiple levels of testing, whereby each lower level of testing has a set of one or more variants chained to a variant of a higher level. Based on the request, the model manager determines which variant of the multiple levels of testing to provide to a user. The determining comprises detecting a lowest segment the user is a member of, whereby each segment level corresponds to a level of testing, and selecting a variant from a corresponding set of one or more variants of the lowest sub-segment, a chained variant of a parent segment, or a control value. The modeling manager transmits a response to an experience component that includes the selected variant, and the experience component causes presentation of the experience with the selected variant.

17 Claims, 22 Drawing Sheets

(56) References Cited

U.S. PATENT DOCUMENTS

| | | | | |
|---|---|---|---|---|
| 11,158,412 | B1 * | 10/2021 | Carlson | G06F 18/214 |
| 11,710,076 | B2 | 7/2023 | Kirsche et al. | |
| 11,726,765 | B2 | 8/2023 | Eldridge et al. | |
| 12,332,765 | B2 * | 6/2025 | Bae | G06F 11/3608 |
| 2007/0038634 | A1 | 2/2007 | Glover et al. | |
| 2022/0374935 | A1 * | 11/2022 | Kulkarni | G06Q 30/0243 |
| 2022/0414548 | A1 | 12/2022 | Ashrafzadeh et al. | |
| 2023/0177539 | A1 * | 6/2023 | Kotta | G06Q 30/0271 705/7.32 |
| 2024/0311618 | A1 | 9/2024 | Sukhavasi et al. | |
| 2024/0320476 | A1 | 9/2024 | Chandrasekaran | |
| 2025/0005430 | A1 | 1/2025 | Vikram | |
| 2025/0157106 | A1 | 5/2025 | Paga et al. | |

OTHER PUBLICATIONS

Kohavi, et al., "Online controlled experiments at large scale", In Proceedings of the 19th ACM SIGKDD international conference on Knowledge discovery and data mining, Aug. 11, 2013, pp. 1168-1176.
NFOA, Issued Mar. 19, 2026, LDK0038US.
U.S. Appl. No. 18/216,042, filed Jun. 29, 2023.

* cited by examiner 802 804 806 808

| METRIC NAME | MODEL_143399_PROD-LXT1_0 VS CONTROL | MODEL_T43399_PROD-LTX1_1 VS CONTROL |
|---|---|---|
| **DAU**<br>ANALYSIS PERIOD: 05/17 - 05/29 | **+ 0.00%**<br>P-VALUE: 01115<br>CT [-0.20, +0.20%]<br>SITE-WIDE: 0.0002% | **+ 0.12%**<br>P-VALUE: 0.2561<br>CL: [-0.11% , +0.72%]<br>SITE-WIDE: 0.08175 |
| **WAU**<br>ANALYSIS PERIOD: 05/17 - 05/29 | **-0.04%**<br>P-VALUE: 0.2171<br>CL: [-0.19% , +0.15%]<br>SITE-WIDE: -0.0035% | **+ 1.13%**<br>P-VALUE: 0.2983<br>CL: [-0.08% , +0.38%]<br>SITE-WIDE: 0.0075% |
| **MAU** | **-0.29%**<br>P-VALUE: 0.7171<br>CL: [-0.19% , +0.14%]<br>SITE-WIDE: -0.0019% | **+ 0.07%**<br>P-VALUE: 0.8500<br>CL:[-1.30% , -1.52%]<br>SITE-WIDE: 0.0049% |
| **SESSIONS** | **-1.27%**<br>P-VALUE: 0.8020<br>CL: [-16.72% , + 18.30%]<br>SITE-WIDE: -0.0008% | **-5.34%**<br>P-VALUE: 0.7299<br>CL: [-25.80% , +25.12%]<br>SITE-WIDE: -0.0026% |
| **MACROSESSIONS**<br>ANALYSIS PERIOD: 05/17 - 05/29 | **-1.95%**<br>P-VALUE: 0.2474<br>CL: [-4.50% , +2.41%]<br>SITE-WIDE: -0.0692% | **+0.24%**<br>P-VALUE: 0.8787<br>CL: [-3.50% , +3.92%]<br>SITE-WIDE: 0.0077% |
| **SIGNUPS**<br>ANALYSIS PERIOD: 05/17 - 05/29 | **+ 0.48%**<br>P-VALUE: 0.9070<br>CL: [-2.5% , +3.71%]<br>SITE-WIDE: -0.0792% | **+ 3.14%**<br>P-VALUE: 0.2837<br>CL: [-2.16% , +8.43%]<br>SITE-WIDE: 0.0498% |
| **REVENUE** | **-0.02%**<br>P-VALUE: 0.7910<br>CL: [-0.48% , +0.46%]<br>SITE-WIDE: -0.0011% | **+ 0.22%**<br>P-VALUE: 0.0313<br>CL: [+0.03% , +0.43%]<br>SITE-WIDE: 0.0141% |

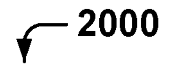
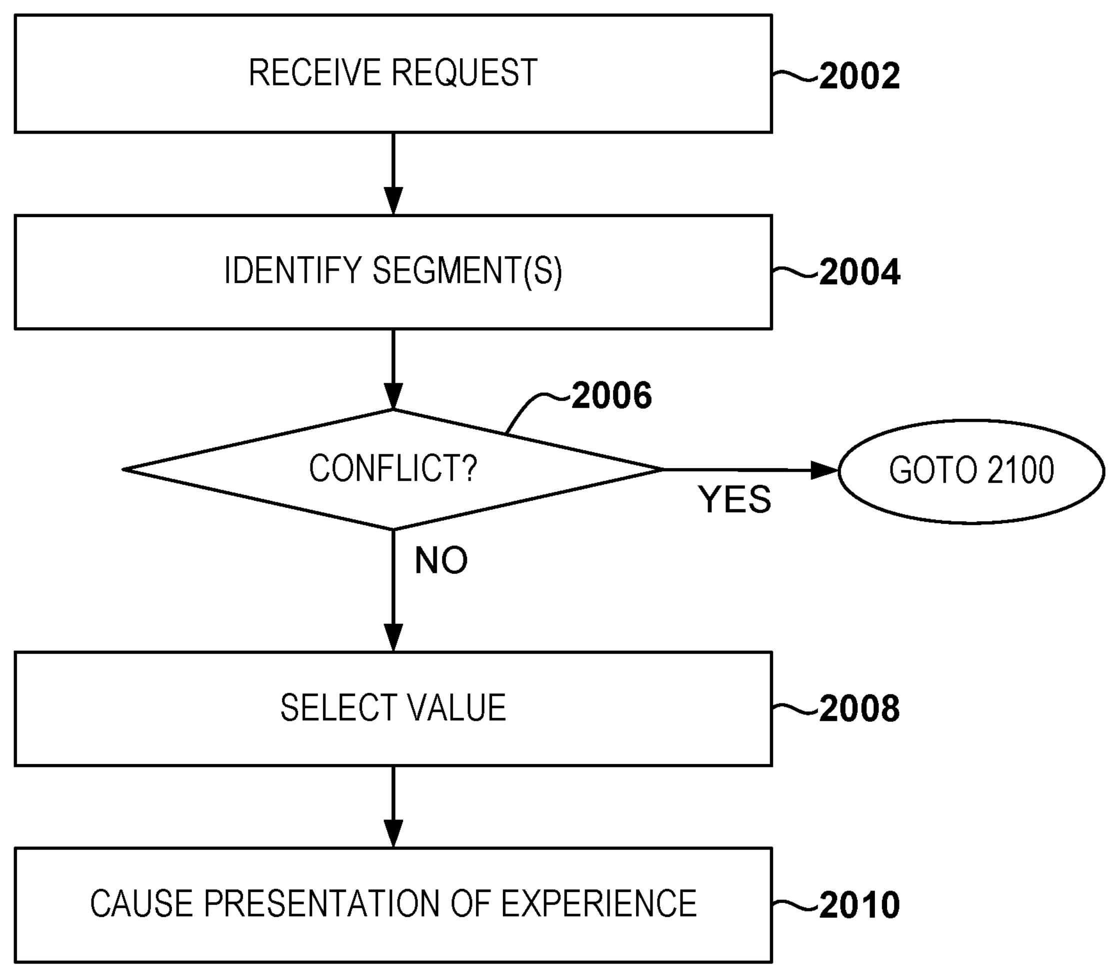
FIG. 20

ARTIFICIAL-INTELLIGENCE MODELING UTILITY SYSTEM

CROSS-REFERENCE TO RELATED APPLICATIONS

This application is a continuation-in-part of prior U.S. application Ser. No. 18/216,042, filed on Jun. 29, 2023, which is incorporated by reference herein in its entirety.

TECHNICAL FIELD

The subject matter disclosed herein generally relates to methods, systems, and machine-readable storage media for a system that provides tools to utilize Artificial-Intelligence (AI) models and create experiments to determine model performance.

BACKGROUND

An online service may provide multiple products to multiple types of users, and different product teams are constantly developing new product features that may be addressed to multiple audience types. Each product team wishes to test the new product features, typically by setting up experiments, each experiment using a different type of modeling, having different features, and/or being offered to different audiences. Based on the results of the experiments, the product teams determine which product features increase value and which models perform better to determine desired goals for introducing the new product features.

Testing each new product feature may be resource and computationally expensive as each test requires developers to define the features, set up the models, configure the tests, and then track the tests. In a large online service, there could be hundreds or thousands of different new features being considered, so it may become very expensive to develop and test all the new features.

BRIEF DESCRIPTION OF THE DRAWINGS

Various of the appended drawings merely illustrate example embodiments of the present disclosure and cannot be considered as limiting its scope.

FIG. 8 is a sample interface for presenting experiment results, according to some example embodiments.

FIG. 20 is a flowchart illustrating operations of a method for presenting an experience based on chained testing, according to example embodiments.

DETAILED DESCRIPTION

Figure 1:
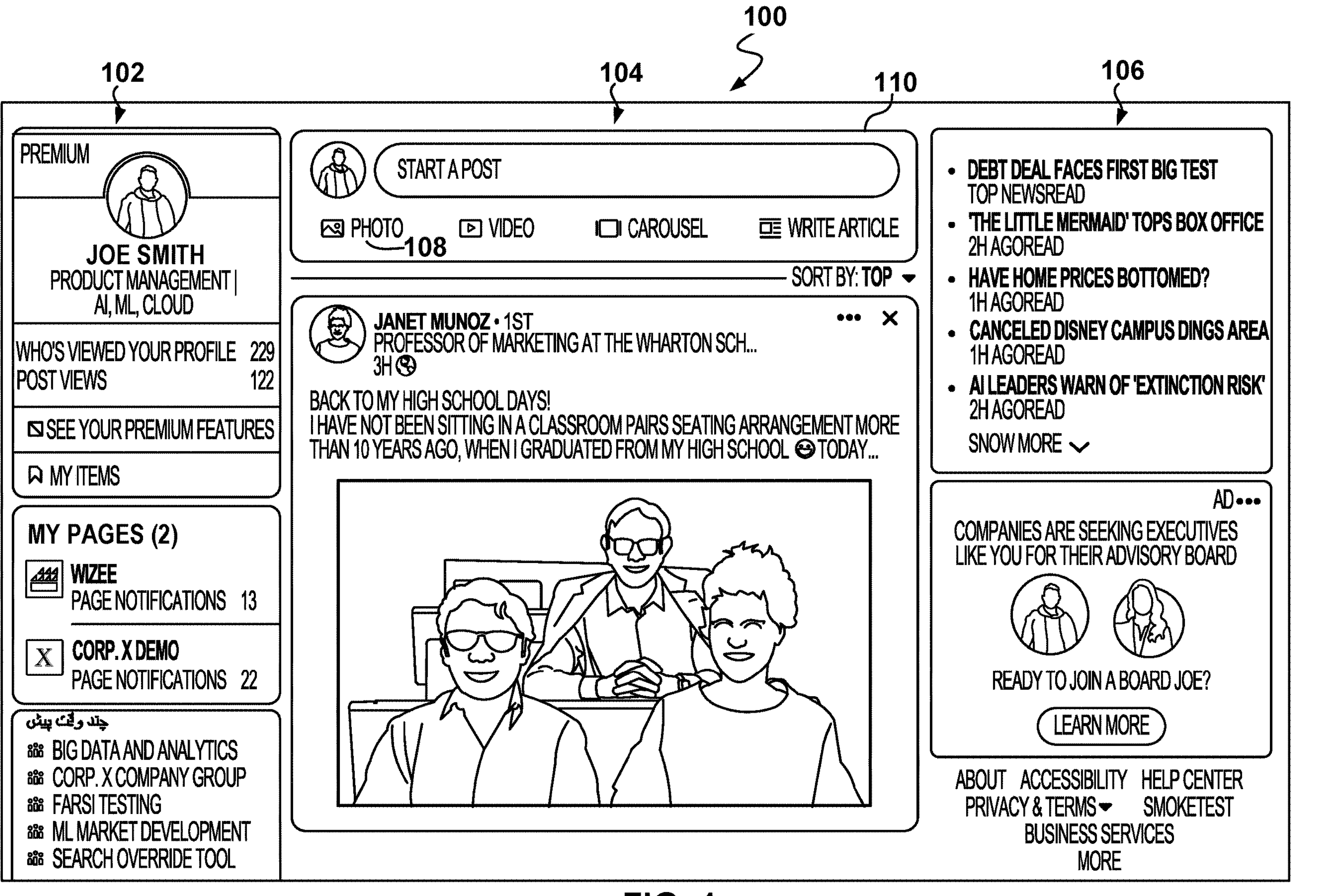
FIG. 1 illustrates a screenshot of a user page, according to some example embodiments.

Example methods, systems, and computer programs are directed to implementing an artificial-intelligence modeling utility system. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In one aspect, an AI Model Manager (AIMM) is provided with features to define feature options, select AI models, and set up experiments for testing the new features. Developers can leverage the relevant AI models to improve member experience and boost impact without additional engineering work requiring coding to set up the AI models. For example, a developer may select one or more models to improve email messages, and another developer may select other models for selecting feed messages to encourage users to add additional features to their subscriptions. Further, developers may define the type of audience selected for each experiment. A User Interface (UI) is provided to enable developers to personalize their modeling and configure models and experiments without having to write new programs.

For the purposes of this description the phrases "an online social networking application" and "an online social network system" may be referred to as and used interchangeably with the phrases "an online system," "an online service," "a networked system," or merely "a connections network." It will also be noted that a connections network may be any type of an online network, such as, a professional network, an interest-based network, or any online networking system that permits users to join as registered members. For the purposes of this description, registered members of a connections network may be referred to as simply members or users, and some un-registered users may also access the services provided by the online service. As used herein, a "user" refers to any person accessing the service, either registered or unregistered. Further, some connections networks provide services to their members (e.g., search for jobs, search for candidates for jobs, job postings) without being a social network, and the principles presented herein may also be applied to these connection networks.

One general aspect includes a computer-implemented method that includes an operation for receiving, by a modeling manager, a schema from an experience component, where the experience component implements one or more features of an online service. The schema is a data structure that defines variables for an experiment, and the modeling manager manages a plurality of machine-learning (ML) models. The method further includes providing, by the modeling manager, a first user interface (UI) based on the schema for entering parameter values for the experiment and configuring one or more ML models from the plurality of ML models for the experiment based on the parameter values entered on the first UI. The experiment is initialized, and during the experiment, the modeling manager receives a request from the experience component for data associated with the experiment and selects one of the configured ML models for providing a response to the request. The response is obtained from the selected ML model based on input provided to the ML model based on the request. The modeling manager sends the response to the experience component. Further, a second UI is provided for presenting results of the experiment.

FIG. 1 illustrates a screenshot of a user page 100, according to some example embodiments. In the illustrated example, the user, named Joe Smith, may be a creator of content and a viewer of content generated by other users.

The user page includes a user area 102, a user feed 104, and an announcements area 106. The user area 102 includes information about the user (e.g., name, picture, title), recent activity, groups, events, followed hashtags, My pages, and so on. The announcements area 106 includes miscellaneous items, such as announcements, news, tips, help assistance, and so forth.

The user feed 104 can include various categories such as a start-post field 110 (e.g., add a post with a photo 108), user posts, job recommendations, suggestions for adding new connections (e.g., People You May Know [PYMK]), notifications, sponsored items, shortcuts, news, messages, articles, and the like.

If the user selects the option to start a post, the user may enter text, a photo, or another item (e.g., a video) to create the post. After the user completes the post, the post is presented to connections of the user or is made public for the whole community to access.

Figure 2:
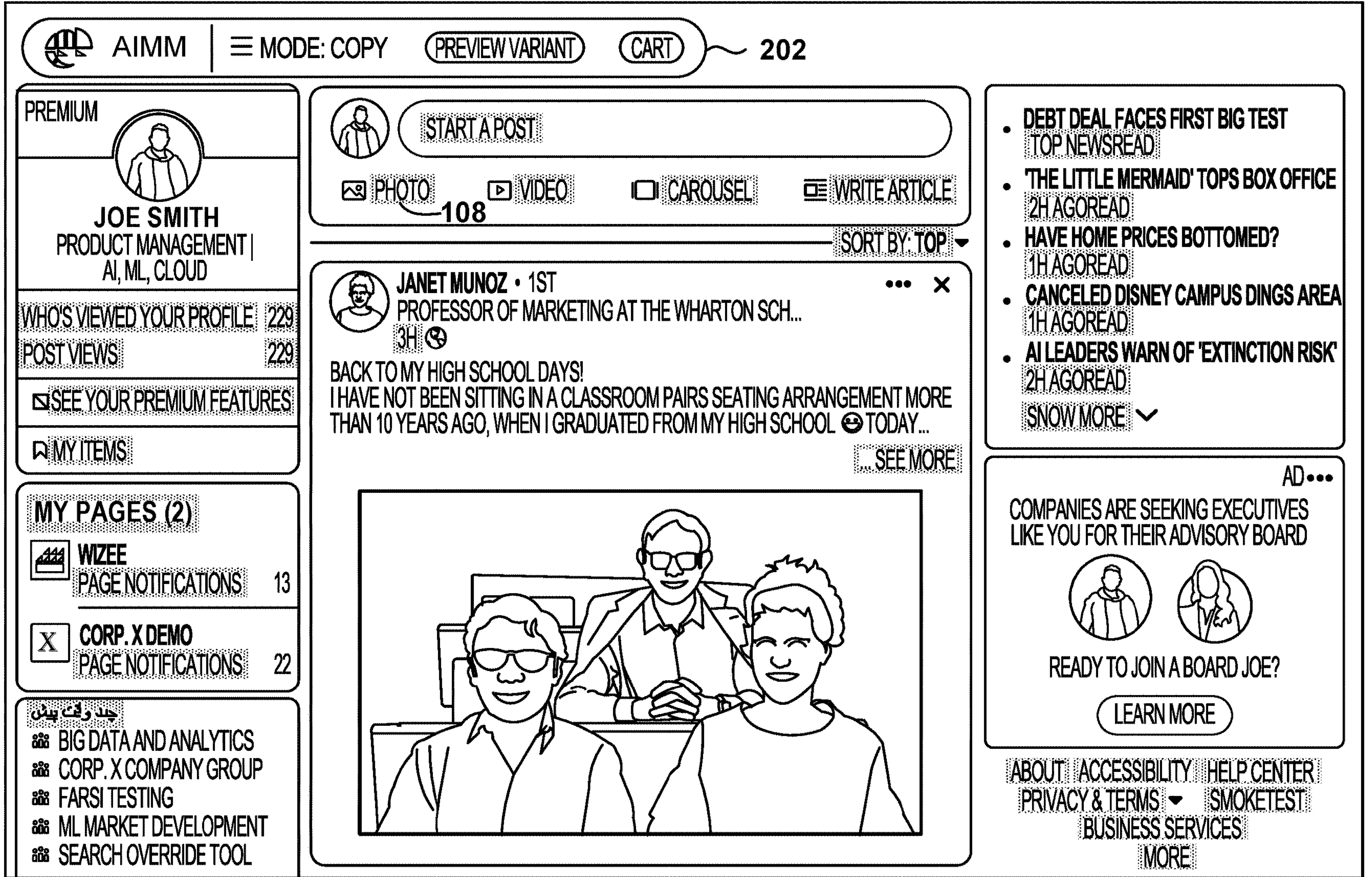
FIG. 2 illustrates the User Interface (UI) of an Artificial Intelligence Modeling Manager (AIMM), according to some example embodiments.

FIG. 2 illustrates the User Interface (UI) of an Artificial Intelligence Modeling Manager (AIMM), according to some example embodiments. In some example embodiments, the UI includes a toolbar 202 with the AIMM options, which is displayed over the UI associated with an experience that is to test a new feature, such as the user page 100 of FIG. 1.

In some example embodiments, the toolbar 202 is implemented as a browser extension, and when the developer selects the browser extension, the toolbar 202 is presented on the current webpage (e.g., webpage including the user page 100), but other embodiments may utilize other type of interfaces to configure the experiment.

In some example embodiments, the toolbar 202 includes the AIMM options (e.g., select mode, preview variant, go to cart). When the developer activates the toolbar 202, AIMM highlights the strings that are selectable for modeling. In the illustrated example, the selectable strings are presented with a different shading, but other embodiments may use other indicators, such as different color, bounding boxes, etc.

In the illustrated example, the developer in charge of increasing the number of clicks on the feed is exploring variations for the word "Photo" 108. A photo may also be referred to by other names, such as image, selfie, snapshot, shot, etc. The developer wants to determine if using a different word in the user page 100 may increase traffic. It is believed that different users may respond better to different words, so that experimentation will account for the characteristics of the user viewing the user page 100. In some embodiments, an experiment refers to a process to determine an efficiency of a service feature provided by the online service, and the experiment includes testing the performance of a machine-learning model with reference to one or more metrics (e.g., increase number of responses to a communication) for a specified segment of users, where the users of the segment share one or more characteristics that define inclusion in the segment. Every user has a unique user identifier (User ID), and all users are segmented by various criteria (e.g., intent, countries, industries, roles, languages, seniority) whereby each segment has a corresponding segment identifier (Segment ID). New segments can be identified ad-hoc. As used herein, a test is the same as an experiment.

The developer uses AIMM to set up the experiments for determining if different sets or segments of users and different models associated with the different sets of users may increase click-throughs. A machine-learning model, also referred to herein simply as model, is a program, resulting from training a machine-learning algorithm, that makes predictions or decisions expressed as outputs or assessments. More details regarding machine learning models are provided below with reference to FIG. 14.

Because different models utilize different structures, configurations, training sets, features, etc., some models will make better predictions than others based on the configuration and properties of the model. AIMM provides a suite of models with different parameters, and the developer wants to know which model will perform better for a desired goal (e.g., using a different word for photo in some user feeds to increase traffic). In some instances, the AIMM is capable of concurrently executing multiple models targeted at different sets of users, and, thereafter, evaluating the performance of each of the concurrently executed models. Further still, the AIMM is capable of concurrently executing multiple models targeted at the same users as will be discussed in more detail below.

AIMM allows developers to easily add any new features or test different features for customization to email, notifications, signup page, feed, profile, search, and so forth. The developers are able to apply new or different user features within any of the existing product flows (e.g., new subject line for emails to users, different salutations for different users, add creative images in sign-up pages). The developers are also able to ramp these variants with one or more models.

In some embodiments, the developers are able to concurrently ramp variants with multiple models and, subsequently, evaluate their performance.

The addition of new feature flows and new models can be done without engineering work and is fully integrated with A/B testing that shows developers the impact of each AI-model and provides performance metrics to compare the efficiency of the different models.

Without AIMM and the embodiments described herein, the developers will have to integrate their AI models into each feature they want to optimize, which is time consuming and not reusable. Additionally, the developers have to create all the variants to be tested and target each variant to a user segment to be able to manually pick the best variant. Furthermore, the developers will have to write code for each of the variants to be tested. With AIMM, the models can be reused for different use cases, so product teams and developers do not have to worry about creating a new model each time a new feature is desired or needs to be tested. Also, AIMM can test several models at the same time by serving a fraction of the requests by each of the models.

Figure 3:
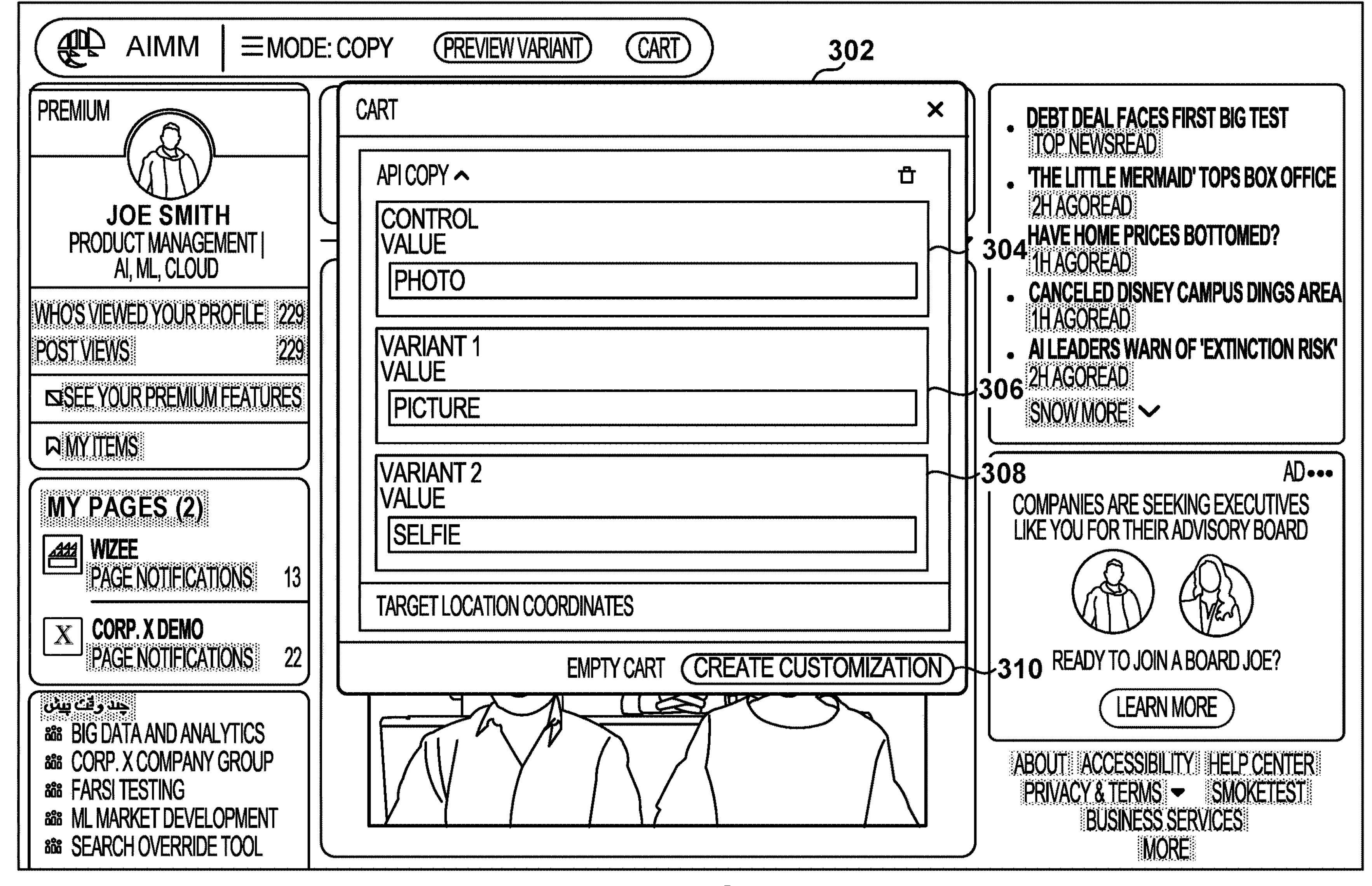
FIG. 3 is a UI for entering parameters to customize an experiment, according to some example embodiments.

FIG. 3 is a UI for entering parameters to customize an experiment, according to some example embodiments. After the developer selects the photo 108 option in the UI of FIG. 2, AIMM provides configuration window 302 to fill in the information for creating a custom experiment, also referred to as a customization. The options in the configuration window 302 are based on a schema previously configured by the experience associated with the developer accessing AIMM, as described in more detail below with reference to FIG. 11.

In the example illustrated in FIG. 3, the customization includes the control value 304 (e.g., "Photo:), a first variant 306 for an alternate text to the control value (e.g., "Picture"), and a second variant 308 for a second alternate text for the control value (e.g., "Selfie").

After the developer enters the configuration information in the configuration window 302, the developer can select create-customization button 310 to initialize the experiment. The developer is then presented the UI described below with reference to FIG. 4 to configure the experiment.

The first variant and the second variant are the variants defined for this experiment. The purpose of the experiment is to determine if the use of one of the variants, for a segment of users, may improve the desired performance metric. Therefore, there is a control variant (the control value or original term) and two different variants that will be tested with the members of the online service.

Figure 4:
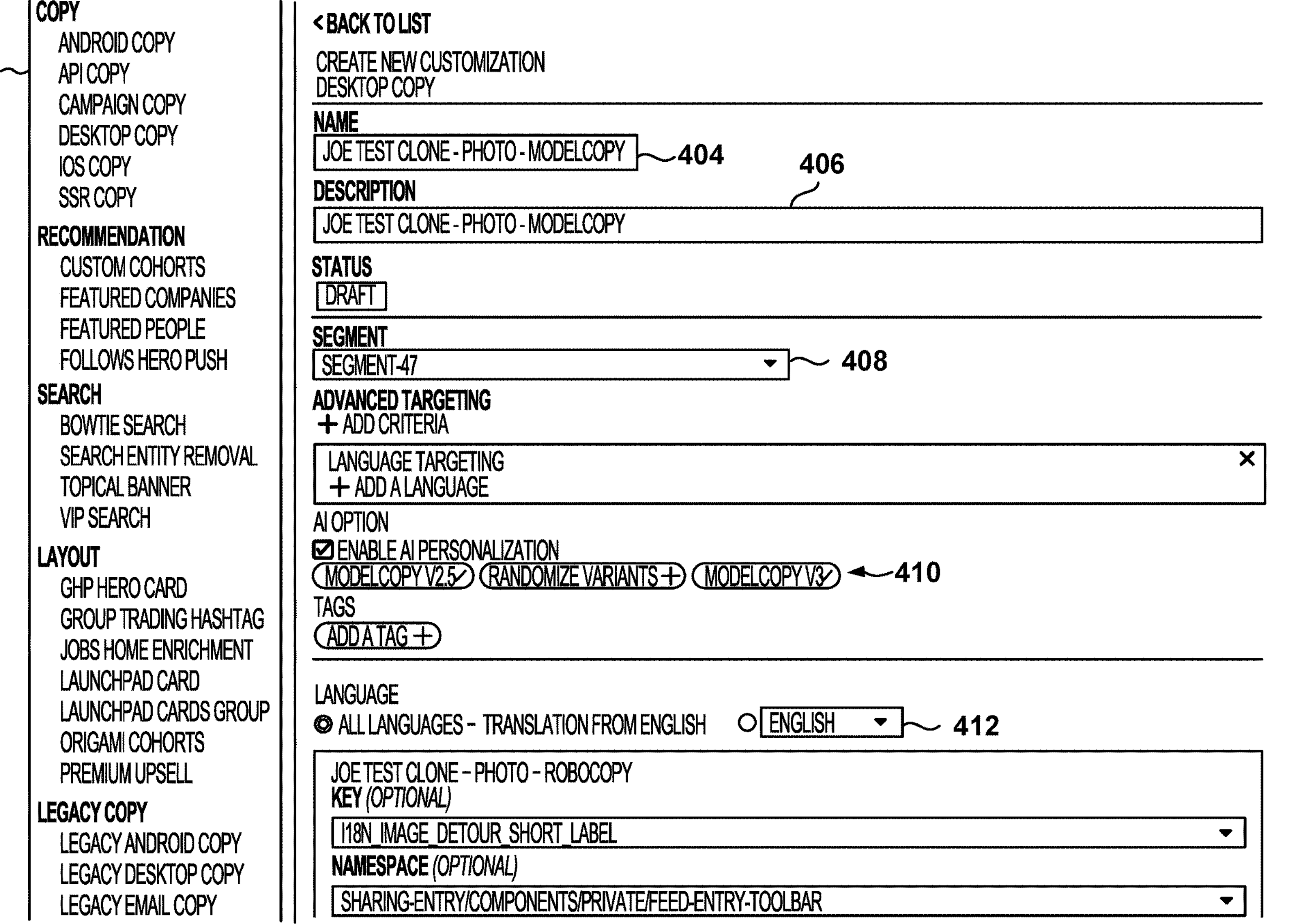
FIG. 4 is a UI for configuring the experiment, according to some example embodiments.

FIG. 4 is a UI 402 for configuring the experiment, according to some example embodiments. The UI 402 is presented in FIGS. 4 and 5, with FIG. 4 presenting a top portion of the UI 402 and FIG. 5 presenting a bottom portion of the UI 402.

The configuration page includes option 404 for entering the name of the experiment, option 406 for entering a description of the experiment, option 408 for identifying one or more segments of the population targeted for the experiment (e.g., a Segment ID), an option 410 to choose one or more models for the experiment, and an option 412 for selecting a language.

In this example, three models are available, named Modelcopy v2.5, Randomize Variants, and Modelcopy v3. The Modelcopy models are models that select text (e.g., copy) to be used in each message sent to a user. The Randomize Variants is a model that generates a random choice, from the list of choices, to select the text for each message. There are two versions of the Modelcopy models, and the developer will want to determine which model performs better according to certain criteria (e.g., increase number of responses). In some examples, the developer is capable of using the UI 402 for concurrently executing multiple Modelcopy models and evaluating their respective results.

Figure 5:
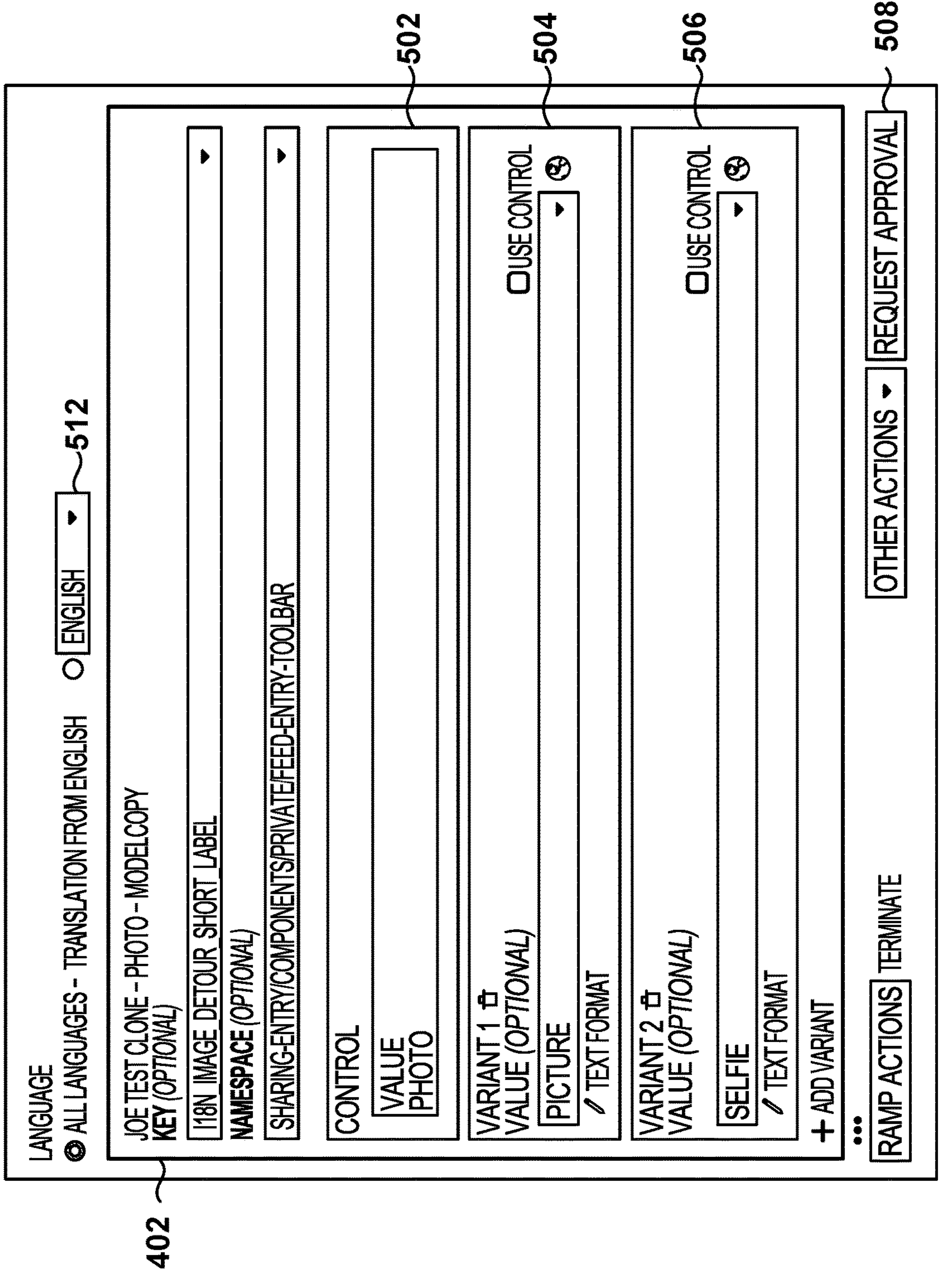
FIG. 5 presents a portion of the configuration UI for entering the variant values, according to some example embodiments.

FIG. 5 presents the portion of the configuration UI 402 for entering the variant values, according to some example embodiments. The values previously entered in the configuration window 302 are populated in the UI 402 and the developer can change the control value 502, the value of the first variant 504, or the value of the second variant 506.

Once the configuration is complete, the developer may select the request-approval button 508 to initiate the experiment. In some embodiments, the information is processed by an administrator to validate the experiment. In other embodiments, a start-experiment button is provided instead, and the experiment is created automatically without having to go through the approval process.

In this example, the two Modelcopy models have been selected, and when the test is run, a percentage of users of the online service (e.g., 5%) will be shown the values chosen by Modelcopy v2.5, and another percentage of users (e.g., 5%) will be shown the values chosen by Modelcopy v3. The percentage of users for each experiment is configurable and may be changed for each experiment. This means that during the experiment, some users will see the word "Photo" in the user feed, some will see the word "Picture," and some will see the word "Selfie."

During the experiments, the selected model will select the proper term for the user based on the parameters configured in the model and the input provided by the experience. For example, a 22-year-old woman is active in the marketing space and posts many selfies, more often than other types of images. Thus, the word "Selfie" may be tested with this woman to check if it will cause an increase in the number of interactions by this user.

Figure 6:
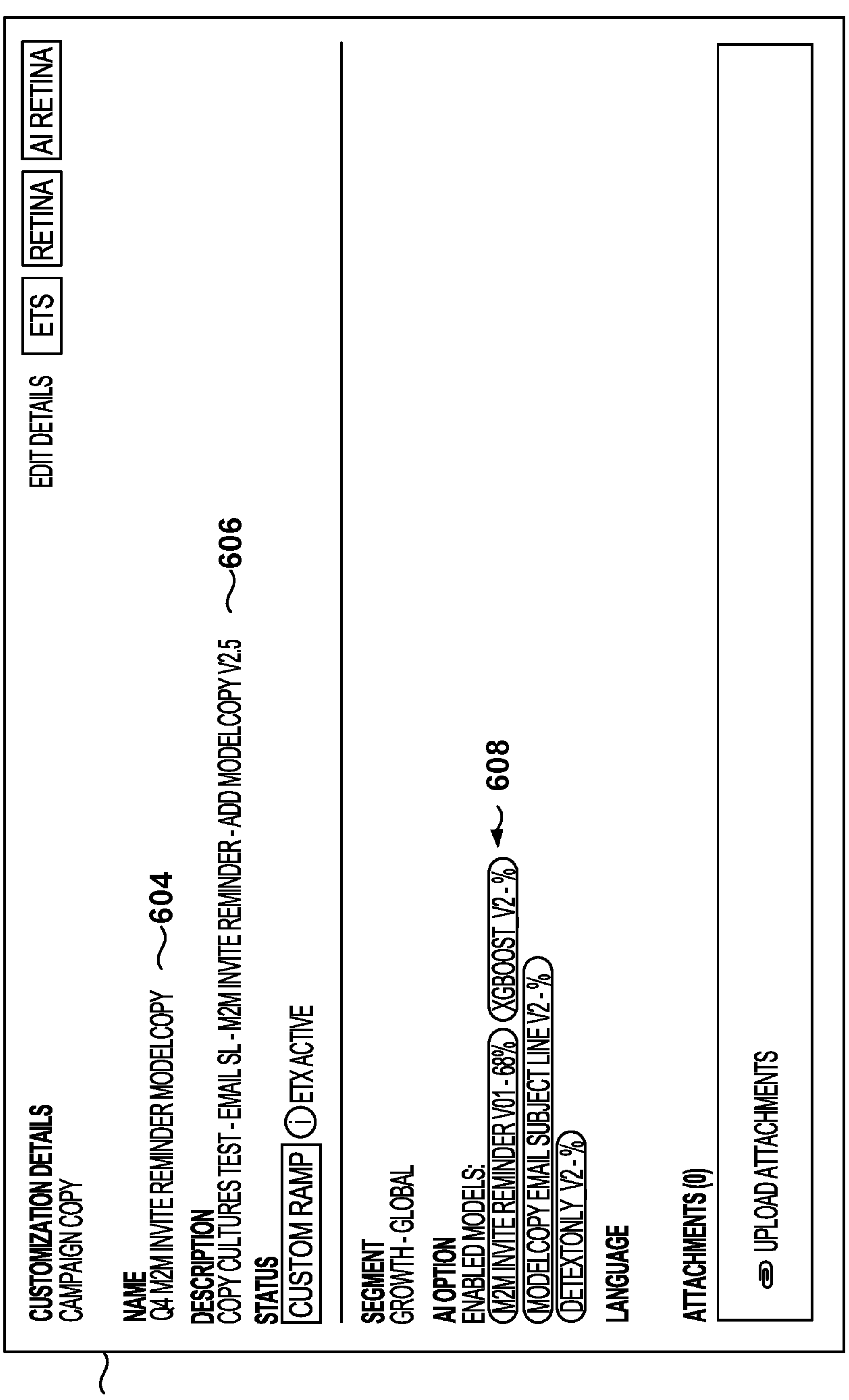
FIG. 6 illustrates the process for configuring another experiment for an email application, according to some example embodiments.

FIG. 6 illustrates the process for configuring another experiment for an email application, according to some example embodiments. In this example, AIMM is used to generate text for an email message to invite a user to connect to another user (also referred to herein as member-to-member invitation). The UI 602 is the configuration UI for this test. The name 604 for the experiment has been entered as "Q4 M2M Invite Reminder Modelcopy", and the description 606 reads, "Copy Cultures Test—Email SL—M2M Invite Reminder—AddModelcopy v2.5." In this case, there are four available models 608, named "m2m invite reminder v 01," "xgboost_v2, "Modelcopy email subject line v2," and "detextOnly_v2."

Some users get invitations to connect with other users, and the online service sends periodic reminders about the pending invitations, so the user can accept or reject the invitations. For example, "Joe, there are 16 invitations pending for you." In this experiment, the subject line of the email reminder is selected by one of the models. The goal of the experiment is to determine which of the models provides suggestions that increase the probability that the user responds to the reminder.

Figure 7:
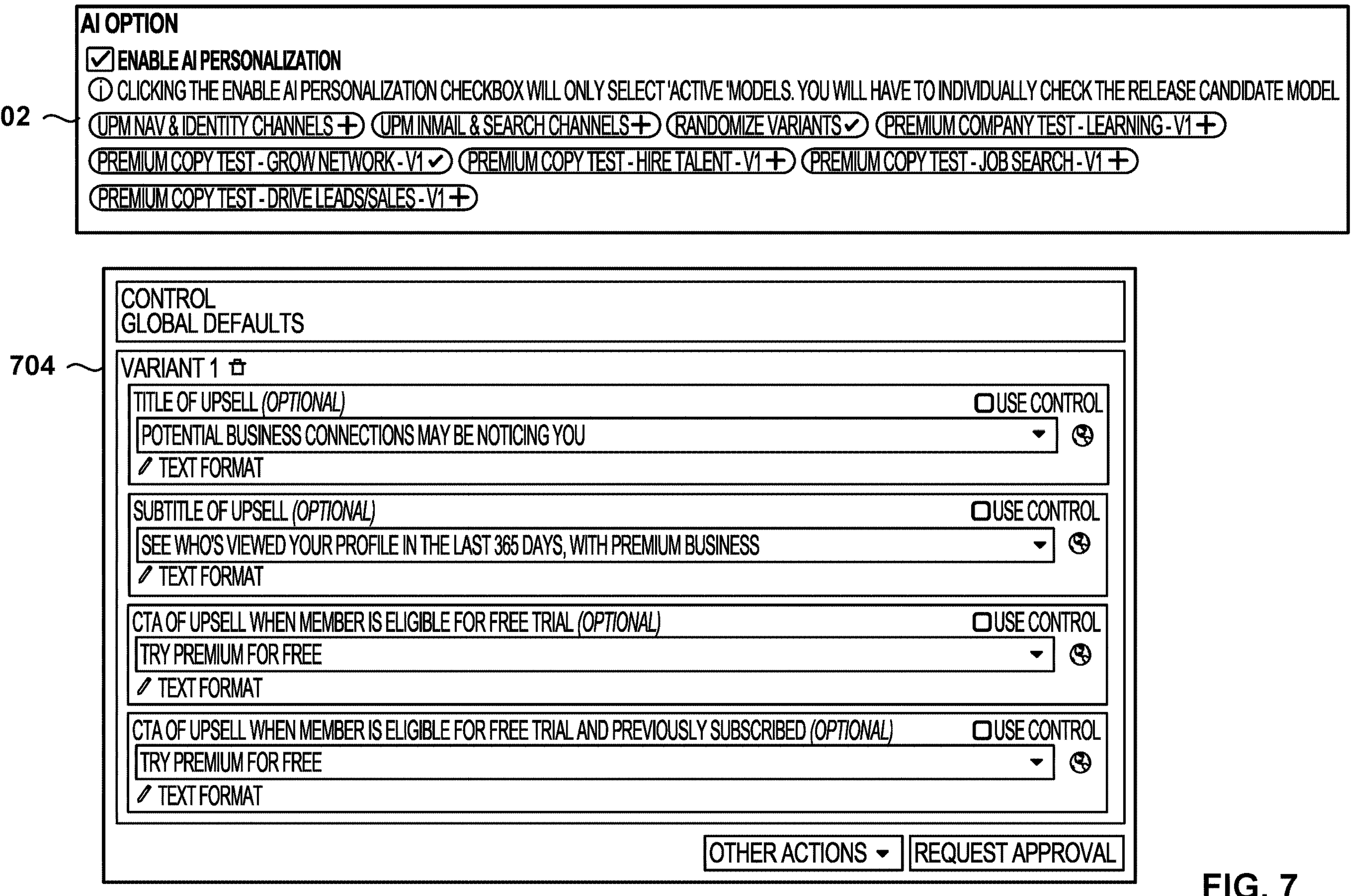
FIG. 7 illustrates another example for entering variants in a premium-upsell application, according to some example embodiments.

FIG. 7 illustrates another example for entering variants in a premium-upsell application, according to some example embodiments. In this example, the developer wishes to increase sales of a premium product targeted to recruiters looking to hire. The example is referred to as premium upsell.

The invitations to upgrade the service level are sent to candidates via different mechanisms, such as email, inservice communication, text message, etc. The models are configured to select the text for the notification.

The UI 702 shows the configuration section for selecting the model. In this case, there are eight choices, and the developer has selected two models: "Randomize Variants" and "Premium Copy Test—Grow Network—V1."

The UI 704 presents the options for configuring this experiment, which include a Variant 1 with multiple fields: title of upsell, subtitle of upsell, CTA (call to action) of upsell when member is eligible for free trial, and CTA of upsell when member is eligible for tree trial and previously subscribed. It is noted that this experiment has more fields because the schema to configure this type of experiment included these fields.

The AIMM system may be used in other types of examples, such as recommending search topics based on the user intent, driving engagement rate by dynamically choosing the best cohorts presented on company and profile pages, selecting the most useful talent insights, changing the order of follows and connections in discovery pages to increase engagement, driving engagement on profile pages by personalizing page layout based on user intent, curating a learning curriculum from predefined choices for users, recommending articles on the user feed to increase interactions, customizing salutations, and so forth.

FIG. 8 is a sample UI 802 for presenting experiment results, according to some example embodiments. After an experiment is run, multiple types of reports are available to describe the results. In the illustrated example, the UI 802 presents results in a table with one experiment per row, with the name of the measured metric in the first column 804, the results for a first model 806 in the second column, and the results for a second model 808 in the third column. The results show the comparison with the control variable.

For each model and metric, the results include a percentage change in the objective by using the model, a p-value, and other experiment data. The p-value is a statistical measure used to determine the significance of a relationship between two variables, where a low p-value indicates that there is a strong relationship between the variables, while a high p-value indicates that there is no significant relationship. P-values are often used to evaluate the performance of a machine learning model. A low p-value for a model indicates that the model is likely to make accurate predictions, while a high p-value indicates that the model is likely to make inaccurate predictions.

In the illustrated example, results 810 are shown for metric "Total Macrosessions" and model "Model t43399_prod-ltx1_v1 vs Control." The results 810 show a low p-value of 0.0313, which shows that the improvement is statistically significant. The developer may then decide to use this model in production due to the improvement showed by the model to increase the number of sessions by users of the online service.

Figure 9:
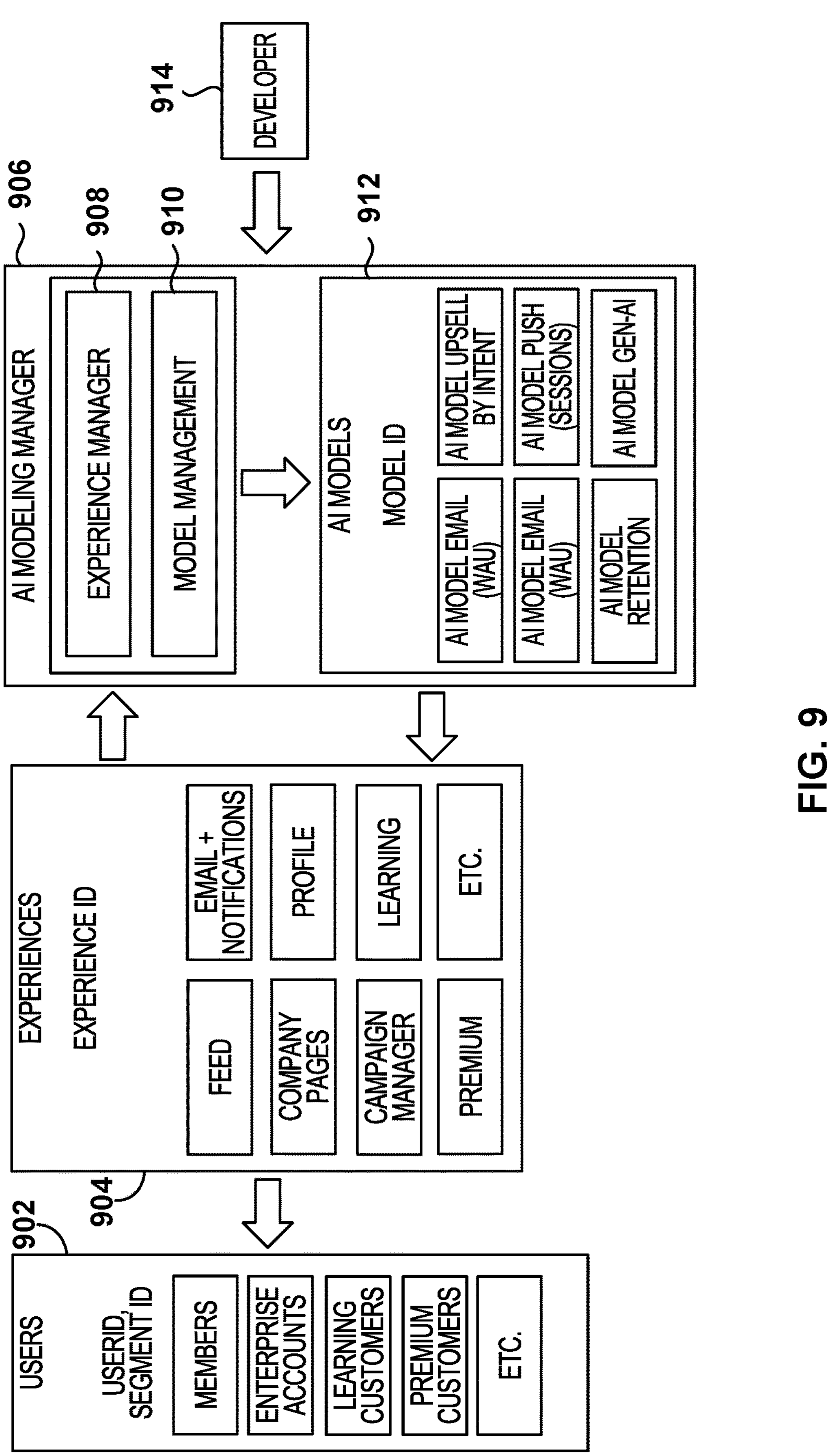
FIG. 9 is a high-level architecture for the AIMM, according to some example embodiments.

FIG. 9 is a high-level architecture for the AIMM 906, according to some example embodiments. The users 902 include the entities accessing the online service, such as members, enterprise accounts, learning customers, premium customers, etc. Each user is assigned a user identifier (user ID).

Further, the users 902 may be segmented for different purposes, and each segment is assigned a segment identifier (segment ID). A segment defines a plurality of users with a shared characteristic. The characteristics to define segments may be of different types, such as demographics (e.g., age, geographic location, time zone, country), language, work title, type of customer (e.g., premium user vs. non-paying subscribers), status on the online service, (e.g., number of followers, number of connections), and so forth. New user segments can be identified ad-hoc.

Experiences 904 refer to the different product offerings of the online service, such as user feed, emails and notifications, company pages, profile pages, campaign manager, learning product (education), premium selling service, and so forth. Each experience is assigned an experience identifier (experience ID). As used herein, an experience is a program that implements one or more features of the online service. In some embodiments, an experiment may use one or more models that are differentiated from each other based on one or more features.

The developer 914 is an individual (e.g., a product manager) associated with an experience offered by the online service. The developer 914 interacts with the AIMM 906 to configure experiments and take advantage of the AI modeling services provided by the AIMM 906. In some cases, the developer 914 may add additional experience IDs by submitting a request to the AIMM 906. The developer does not have to be an experienced programmer because no coding expertise is required to execute the AIMM 906.

The AIMM 906 includes an experience manager 908, a model management component 910, and AI models 912. Each AI model 912 is assigned a model identifier (model ID). The experience manager 908 manages the setup and configuration of new tests during experiments, including processing a schema received from the developer 914 to configure a test.

In general, a schema is a data structure that defines the structure of data, such as the structure of data in a database. For the AIMM 906, the schema defines the parameters of the test, and the AIMM creates the configuration pages to enter the variants based on the schema defined by the developer 914. The schema defines the tables, columns, and relationships between the data in the experiment.

The model management component 910 is in charge of the management of the AIMM 906, including providing APIs for receiving requests, setting up the user interfaces (UIs) for the developers, etc. More details on the AIMM 906 are provided below with reference to FIG. 11.

The AI models 912 include the models available for experimentation, such as models for text of email messages, text on a UI, text for text messages, text for invitations, and so forth, and each model 912 may be configured to improve one or more objectives, such as increase number of sessions, increase number of responses, increase number of invitations sent, increase number of service upgrades, increase user retention, and so on.

The AIMM 906 allows the developer 914 to optimize experiences (without having to code new programs), select one or more AI models 912, select the desired user ID, and/or select the segment ID for the experimentation. The AIMM 906 sets up the models 912 to automatically learn user preferences and generate estimates in real-time to optimize the experience for each developer 914.

The AIMM 906 allows a large audience to be segmented and served by audience specific models. For example, a member-to-member invite reminder email can be optimized by geography (e.g., India, USA) and each country can be served by a country specific model.

Further, the AIMM 906 allows for faster product feature additions by decoupling the features from the AI models 912. For instance, notification emails powered by one AI model can be migrated to a new AI model without any additional engineering development required by the developer.

Figure 10:
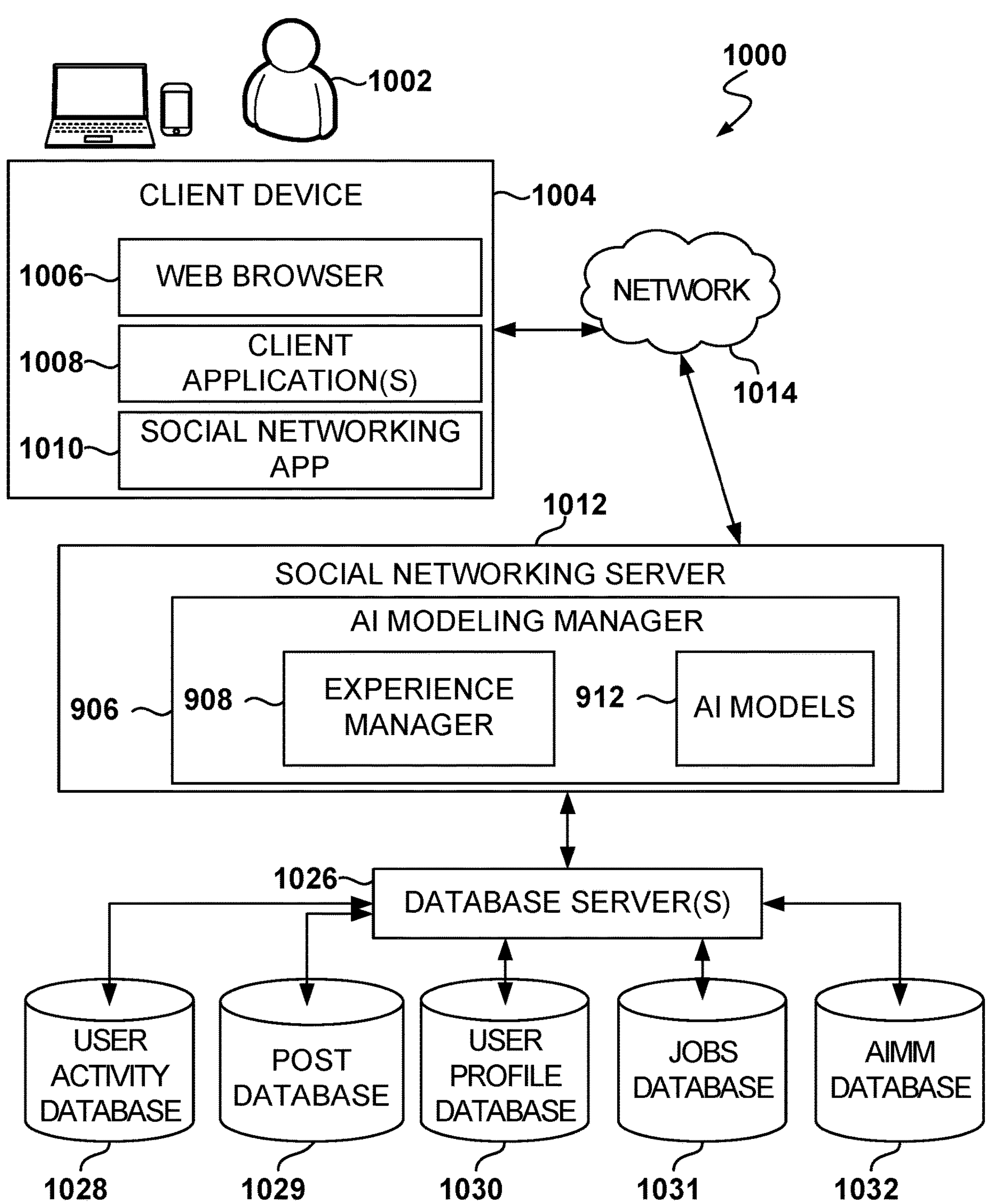
FIG. 10 is a block diagram illustrating a networked architecture, according to some example embodiments.

FIG. 10 is a block diagram illustrating a networked architecture 1000, according to some example embodiments. The networked architecture 1000 includes a social networking server 1012, illustrating an example embodiment of a high-level client-server-based network architecture. Embodiments are presented with reference to an online service, and, in some example embodiments, the online service is a social networking service.

The social networking server 1012, a distributed system comprising one or more machines, provides server-side functionality via a network 1014 (e.g., the Internet or a wide area network (WAN)) to one or more client devices 1004. FIG. 10 illustrates, for example, a client device 1004 with a web browser 1006, client application(s) 1008, and a social networking app 1010 executing on the client device 1004. The social networking server 1012 is further communicatively coupled with one or more database servers 1026 that provide access to one or more databases 1028-1032.

The social networking server 1012 includes, among other components, the AIMM 906, which includes, at least, the experience manager 908 and the AI models 912.

The client device 1004 may comprise, but is not limited to, a mobile phone, a desktop computer, a laptop, a tablet, a netbook, a multi-processor system, a microprocessor-based or programmable consumer electronic system, or any other communication device that the user 1002 may utilize to access the social networking server 1012. In some embodiments, the client device 1004 may comprise a display module (not shown) to display information (e.g., in the form of user interfaces).

In one embodiment, the social networking server 1012 is a network-based appliance, or a distributed system with multiple machines, which responds to initialization requests or search queries from the client device 1004. One or more users 1002 may be a person, a machine, or other means of interacting with the client device 1004. In various embodiments, the user 1002 interacts with the networked architecture 1000 via the client device 1004 or another means.

In some embodiments, if the social networking app 1010 is present in the client device 1004, then the social networking app 1010 is configured to locally provide the user interface for the application and to communicate with the social networking server 1012, on an as-needed basis, for data and/or processing capabilities not locally available (e.g., to access a user profile, to authenticate a user 1002, to identify or locate other connected users 1002). Conversely, if the social networking app 1010 is not included in the client device 1004, the client device 1004 may use the web browser 1006 to access the social networking server 1012.

In addition to the client device 1004, the social networking server 1012 communicates with the one or more database servers 1026 and databases. In one example embodiment, the social networking server 1012 is communicatively coupled to a user activity database 1028, a post database 1029, a user profile database 1030, a jobs database 1031, and an AIMM database 1032. Although one AIMM database 1032 is illustrated, there could be multiple databases, and each AI model 912 may have its own database for training data, model inference, result tracking, etc.

The user activity database 1028 keeps track of activities of the users in the online service, and the post database 1029 stores information about the posts generated by users including the posts added to groups. The user profile database 1030 stores profile information about the users. The jobs database 1031 stores information about jobs listed in the online service, and the AIMM database 1032 stores information associated with experiments, such as model information, configured experiments, developer schemas, experiments being deployed, training data, developer data, and so forth.

In some example embodiments, when a user 1002 initially registers to become a user 1002 of the social networking service provided by the social networking server 1012, the user 1002 is prompted to provide some personal information, such as name, age (e.g., birth date), gender, interests, contact information, hometown, address, spouse's and/or family users' names, educational background (e.g., schools, majors, matriculation and/or graduation dates), employment history (e.g., companies worked at, periods of employment for the respective jobs, job title), professional industry (also referred to herein simply as "industry"), skills, professional organizations, and so on. This information is stored, for example, in the user profile database 1030. Similarly, when a representative of an organization initially registers the organization with the social networking service provided by the social networking server 1012, the representative may be prompted to provide certain information about the organization, such as a company industry.

Some operations may be performed on the client device 1004 instead of the social networking server 1012. For example, the AI models 912 may execute on a mobile phone utilizing processors and Graphics Processing Units (GPUs) of the mobile phone.

Figure 11:
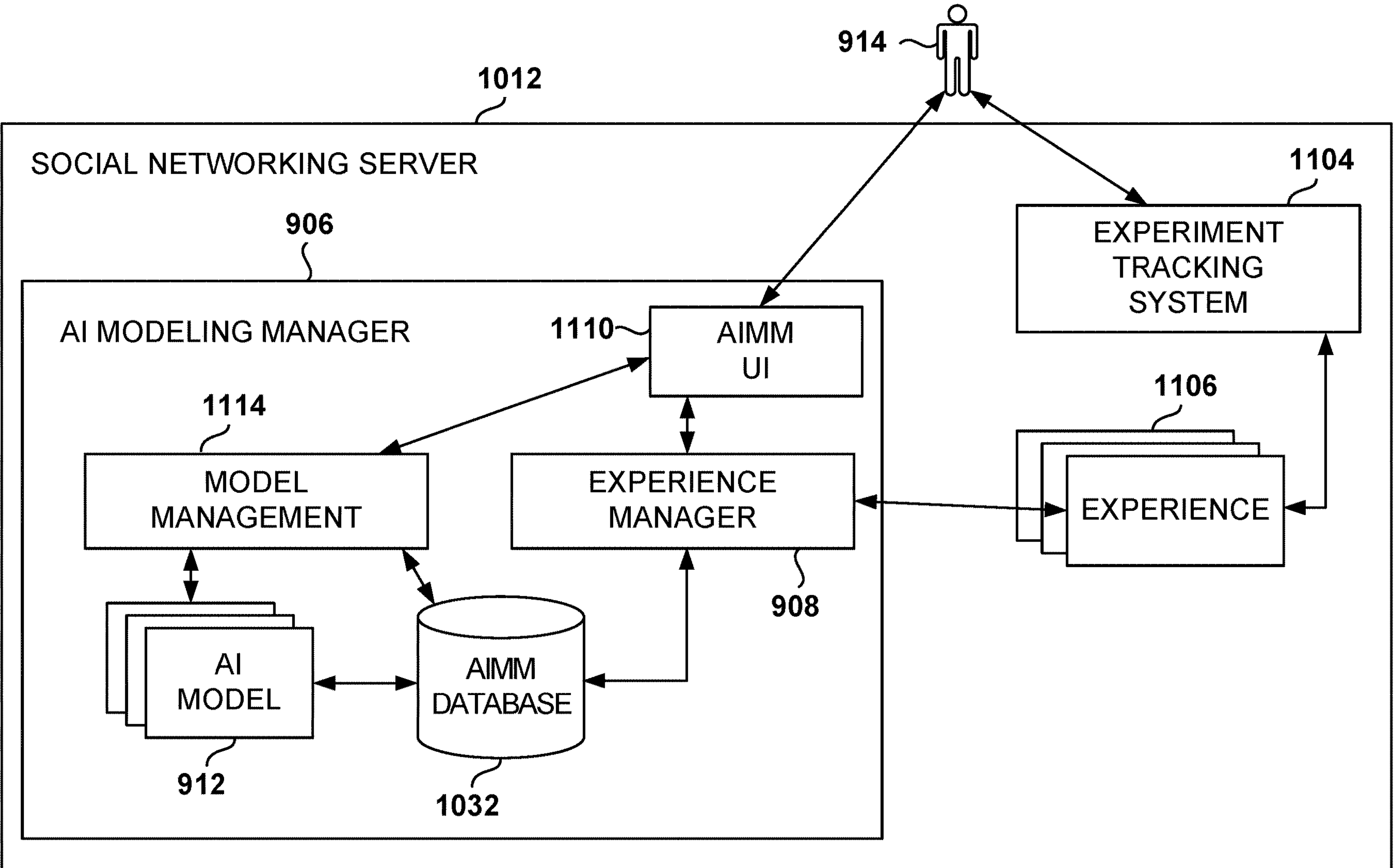
FIG. 11 is a diagram illustrating the use of the AIMM and the interactions with the experience applications of the social networking server, according to some example embodiments.

FIG. 11 is a diagram illustrating the use of the AIMM 906 and interactions with the experience applications of the social networking server 1012, according to some example embodiments. The AIMM 906 integrates with each of these different experiences 1106 that power different features that exist on the online service, and then the AI models 912 may be used by the experiences 1106.

In some example embodiments, the AIMM 906 provides Application Programming Interfaces (APIs) to exchange commands and data with the experiences 1106. Initially, the experiences 1106 sends a schema to the experience manager 908 to define the parameters for the experiment, such as the control value and one or more variants. The experience manager 908 takes the received schema and creates a new experiment. The information for the new experiment is stored in the AIMM database 1032, and when the developer 914 invokes the creating of a new experiment, the AIMM UI 1110 for configuring the experiment is created based on the schema definition. The model management component 1114 automatically trains the models, generates scoring data, and configures the AI models 912 to optimally target the variants to each member of the target segment.

While one experiment is running, the corresponding models 912 determines an item (e.g., a text message, a word, an image) based on the experiment and user data, and the item is transferred back to the experience 1106. The experience 1106 receives the item generated by the model 912 and then uses the item in the normal flow of operations for the corresponding experiences.

The AIMM 906 provides multiple AI models 912 so that the developers have choices for selecting models based on the goal. Some models may be geared towards webpages and other towards email communications; some models may be used for driving clickthroughs, while other models are geared towards increasing revenue, and so on.

Once the experiment begins, the experiment information is transmitted to the experiment tracking system 1104 that tracks, for example, the messages sent by the different experiences 1106 and the responses from the users. The experiment tracking system 1104 provides reporting utilities for examining the experiment results, such as the UI shown in FIG. 8. When the experience invokes the AIMM 906 to get an item, the AIMM 906 returns data, referred to as payload, and the payload includes information for the experiment tracking system 1104, so when messages are sent, the responses can be tracked by the experiment tracking system 1104.

The AI models 912 may utilize the information available in the social networking server 1012, such as the information in databases that include user profile information, user activity information, company information, post information, etc. Thus, when one experience 1106 invokes a model, an input for the model will be the input requesting the inference (e.g., create a subject line for the attached notification), and other inputs for the model may include other related information, such as user ID, segment ID, experiment ID, user profile information, activity of the user information, and so on. Based on the input provided, the AI models 912 will generate the requested output (e.g., text for the subject of the email).

Over time, the AIMM team can develop additional models and make the new models available to the experience 1106. Additionally, the experience developers may create their own new models, and these models may also be shared with the AIMM 906 and added to a library of available models.

For illustration purposes, a comparison is presented of the effort required to implement a new model by a developer. In conventional model development, without the functionality of AIMM 906, the developer would have had to configure and train a new model from scratch and then integrate the new model with the functionality already provided by the experience. If a second developer wants to use the same model, the second developer will have to also build and train the new model and then integrate the model with their own experience 1106. Further, comparing the performance of different models would require having to set up multiple experiments with the multiple models, and the models could not be run simultaneously. As such, the result data may not be as precise because each model has a different running environment.

With the AIMM 906, a common training, configuration, and serving infrastructure is available for multiple developers. Further, the models can be shared between experiences (e.g., the same model can be applied to several experiences that send emails), and different models can be ramped to different sub-segments of the same experiences (e.g., country-specific models for generating job alerts). New integrations are not needed to apply models, and the models do not need to be manually re-trained for each different segment; the AIMM 906 will automatically train the models and generate estimates for each segment. Also, multiple models can be ramped to the same audience, and the relative model performance can be compared. The model performance can also be compared to static variants.

Figure 12:
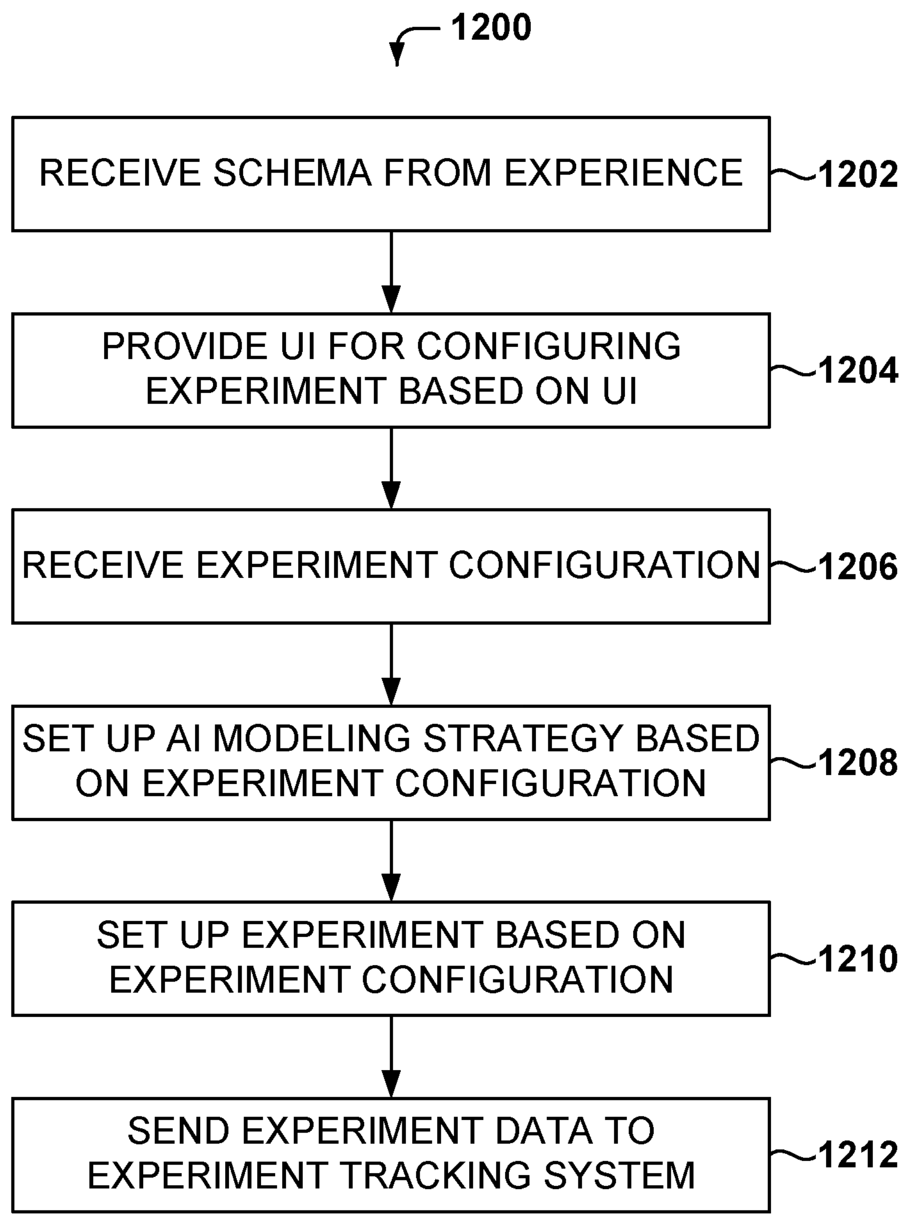
FIG. 12 is a flowchart of a method for setting up an experiment, according to some example embodiments.

FIG. 12 is a flowchart of a method 1200 for setting up an experiment, according to some example embodiments. While the various operations in this flowchart are presented and described sequentially, one of ordinary skill will appreciate that some or all of the operations may be executed in a different order, be combined or omitted, or be executed in parallel.

At operation 1202, a schema is received from one experience, where the schema defines parameters for an experiment. As discussed above, at operation 1204, the schema is used to set up the UI for configuring the options of the experiment, including the input fields associated with the schema. The schema may include text, images, videos, sound, and so on.

An example of a simple schema for a control variable and two variants can be as follows:

```
CREATE TABLE experiment (
 id INT NOT NULL AUTO_INCREMENT,
 control VARCHAR(255) NOT NULL,
 variant1 VARCHAR(255) NOT NULL,
 variant2 VARCHAR(255) NOT NULL,
 PRIMARY KEY (id)
);
```

This schema defines a table called experiment with four columns: id (ID of the experiment), control (the control variable), variant1 (variant 1 variable), and variant2 (the variant 2 variable).

From operation 1204, the method 1200 flows to operation 1206, where the configuration for the new experiment is received, such as the information described above with reference to FIGS. 4-5.

At operation 1208, the AIMM 906 sets up the AI modeling strategy for running the experiment based on the experiment configuration.

From operation 1208, the method 1200 flows to operation 1210 to set up the new experiment based on the experiment configuration and the AI modeling strategy.

At operation 1212, the experiment information is shared with the experiment tracking system 1104 to configure the tracking for the new experiment.

Figure 13:
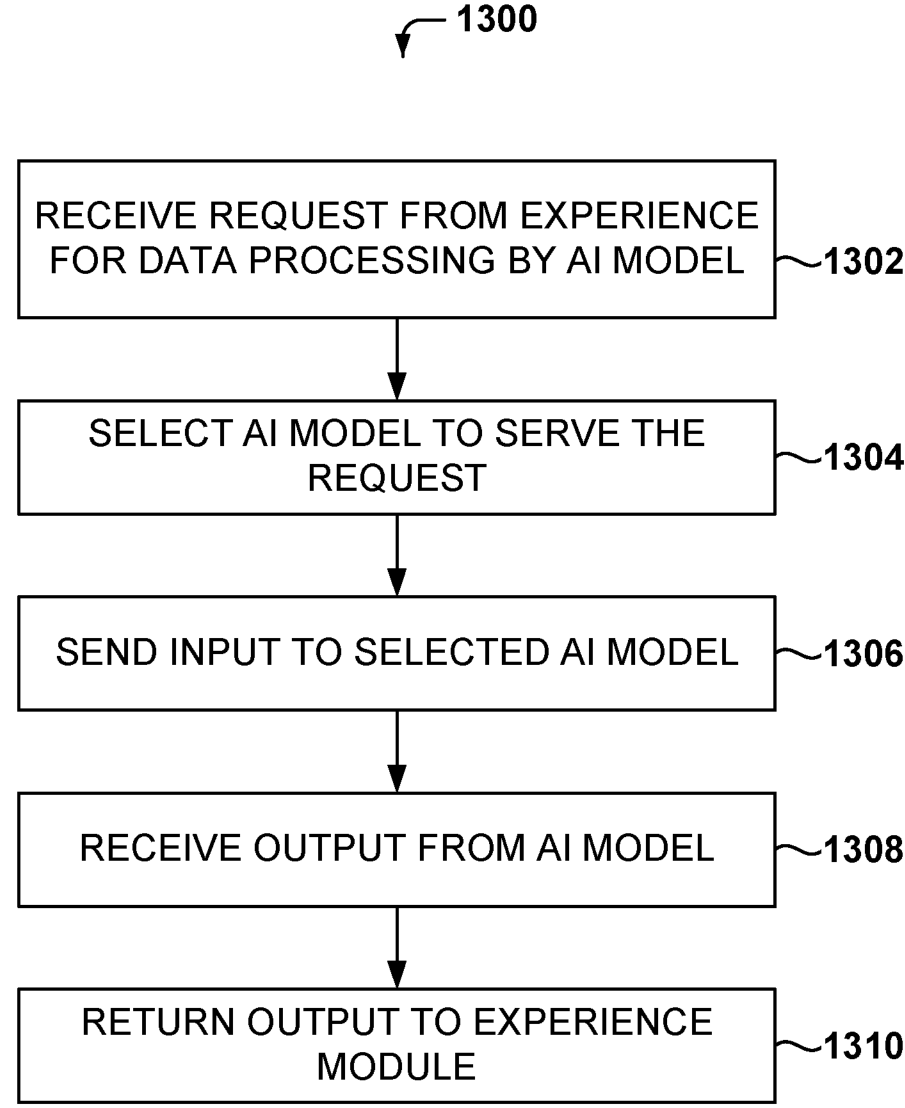
FIG. 13 is a flowchart of a method for using the AIMM tool during the experiment, according to some example embodiments.

FIG. 13 is a flowchart of a method 1300 for using the AIMM tool during the experiment, according to some example embodiments. While the various operations in this flowchart are presented and described sequentially, one of ordinary skill will appreciate that some or all of the operations may be executed in a different order, be combined or omitted, or be executed in parallel.

At operation 1302, the AIMM 906 receives a request from one of the experiences for data that is generated by one of the configured models. For example, the experience may be sending an email to notify the user that new invitations are waiting, and the experience wants to know the preferred text to send in the email to the specific user. Thus, the experience may pass information including one or more of the experiment ID, the user ID of user receiving the email, the segment ID, and the proposed text.

At operation 1304, the AIMM 906 selects one of the models 912 to generate the response. The AIMM 906 takes into consideration the parameters of the experiment (e.g., percentage of users in the segment ID that are receiving the message created by the particular model) and selects the model 912. For example, the experiment may have been configured such that 10% of members get variant A, 10% get variant B, and 80% get the control value.

At operation 1306, the input is provided to the selected model 912, and, at operation 1308, the output of the model 912 is received by the AIMM 906. The output of the model 906 is then returned, at operation 1310, to the requesting experience. For example, the input may include the text of a message to be sent to a particular user ID for a particular segment ID, and the output may be the text to be sent on the message.

Figure 14:
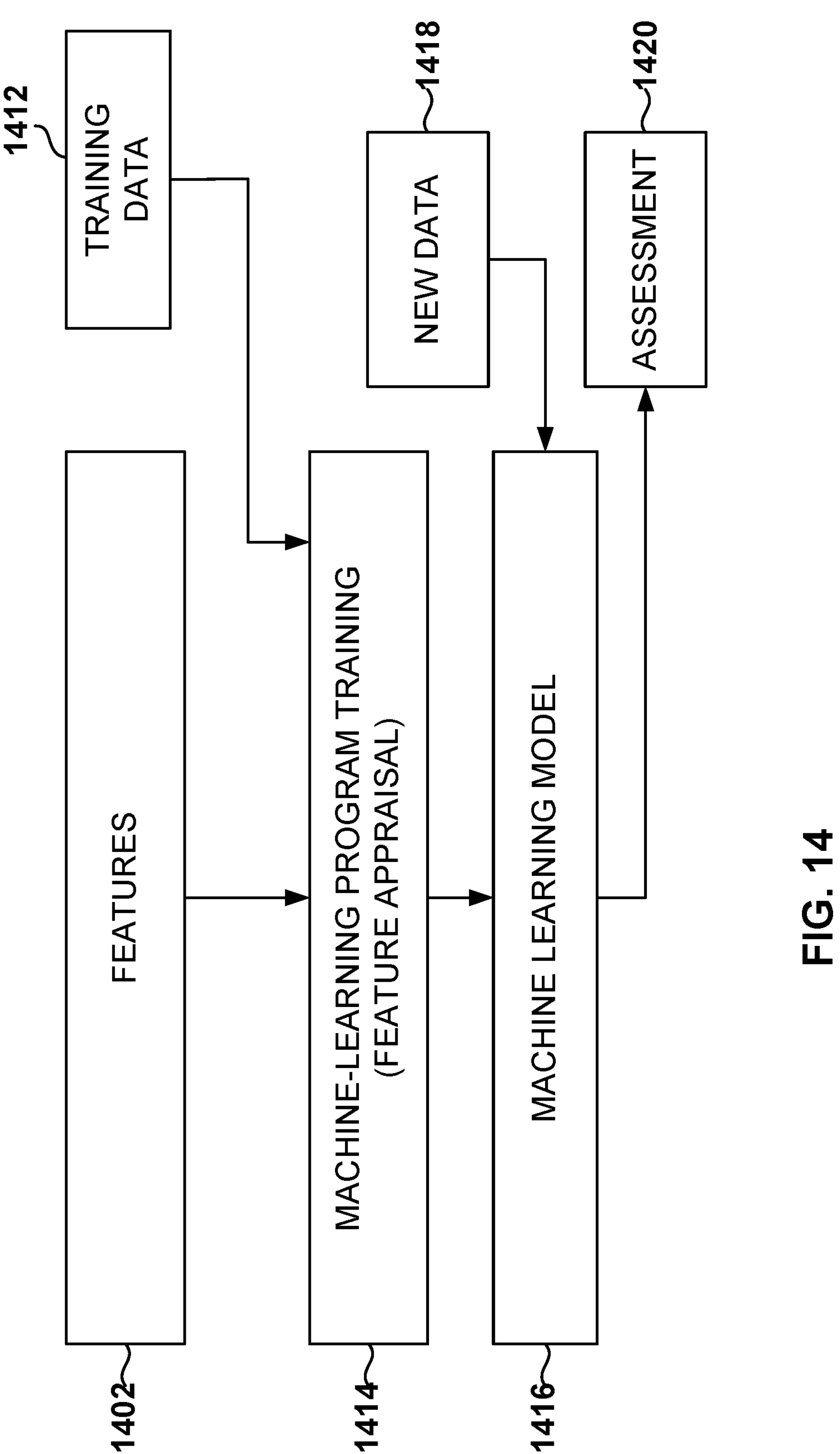
FIG. 14 illustrates the training and use of a machine-learning model, according to some example embodiments.

FIG. 14 illustrates the training and use of a machine-learning model, according to some example embodiments. In some example embodiments, machine-learning (ML) models 1416, are utilized to perform operations associated with experiments, such as selecting a piece of text included in a user feed, a type of salutation to be used, or the subject line for an email message.

Machine Learning (ML) is an application that provides computer systems the ability to perform tasks, without explicitly being programmed, by making inferences based on patterns found in the analysis of data. Machine learning explores the study and construction of algorithms, also referred to herein as tools, that may learn from existing data and make predictions about new data. Such machine-learning algorithms operate by building the ML model 1416 from example training data 1412 in order to make data-driven predictions or decisions expressed as outputs or assessments 1420. Although example embodiments are presented with respect to a few machine-learning tools, the principles presented herein may be applied to other machine-learning tools.

There are two common modes for ML: supervised ML and unsupervised ML. Supervised ML uses prior knowledge (e.g., examples that correlate inputs to outputs or outcomes) to learn the relationships between the inputs and the outputs. The goal of supervised ML is to learn a function that, given some training data, best approximates the relationship between the training inputs and outputs so that the ML model can implement the same relationships when given inputs to generate the corresponding outputs. Unsupervised ML is the training of an ML algorithm using information that is neither classified nor labeled and allowing the algorithm to act on that information without guidance. Unsupervised ML is useful in exploratory analysis because it can automatically identify structure in data.

Common tasks for supervised ML are classification problems and regression problems. Classification problems, also referred to as categorization problems, aim at classifying items into one of several category values (e.g., is this object an apple or an orange?). Regression algorithms aim at quantifying some items (e.g., by providing a score to the value of some input). Some examples of commonly used supervised-ML algorithms are Logistic Regression (LR), Naive-Bayes, Random Forest (RF), neural networks (NN), deep neural networks (DNN), matrix factorization, and Support Vector Machines (SVM).

Some common tasks for unsupervised ML include clustering, representation learning, and density estimation. Some examples of commonly used unsupervised-ML algorithms are K-means clustering, principal component analysis, and autoencoders.

The training data 1412 comprises examples of values for features 1402. In some example embodiments, the training data comprises labeled data with examples of values for the features 1402 and labels indicating the outcome, such as the user posted a photo, the user accessed the online service in response to a message from the online service, the user upgraded the level of service, and so on. The machine-learning algorithms utilize the training data 1412 to find correlations among identified features 1402 that affect the outcome. A feature 1402 is an individual measurable property of a phenomenon being observed. The concept of a feature is related to that of an explanatory variable used in statistical techniques such as linear regression. Choosing informative, discriminating, and independent features is important for effective operation of ML in pattern recognition, classification, and regression. Features may be of different types, such as, numeric, strings, categorical, and graph. A categorical feature is a feature that may be assigned a value from a plurality of predetermined possible values (e.g., this animal is a dog, a cat, or a bird).

In one example embodiment, the features 1402 may be of different types and may include one or more of user information, responses to notifications, activity information, company information, job information, demographic characteristics, and so on.

During training 1414, the ML program, also referred to as ML algorithm or ML tool, analyzes the training data 1412 based on identified features 1402 and configuration parameters defined for the training. The result of the training 1414 is the ML model 1416 that is capable of taking inputs to produce assessments.

Training an ML algorithm involves analyzing large amounts of data (e.g., from several gigabytes to a terabyte or more) in order to find data correlations. The ML algorithms utilize the training data 1412 to find correlations among the identified features 1402 that affect the outcome or assessment 1420. In some example embodiments, the training data 1412 includes labeled data, which is known data for one or more identified features 1402 and one or more outcomes.

The ML algorithms usually explore many possible functions and parameters before finding what the ML algorithms identify to be the best correlations within the data; therefore, training may make use of large amounts of computing resources and time.

When the ML model 1416 is used to perform an assessment, new data 1418 is provided as an input to the ML model 1416, and the ML model 1416 generates the assessment 1420 as output.

In some example embodiments, results obtained by the model 1416 during operation (e.g., assessment 1420 produced by the model in response to inputs) are used to improve the training data 1412, which is then used to generate a newer version of the model. Thus, a feedback loop is formed to use the results obtained by the model to improve the model.

Figure 15:
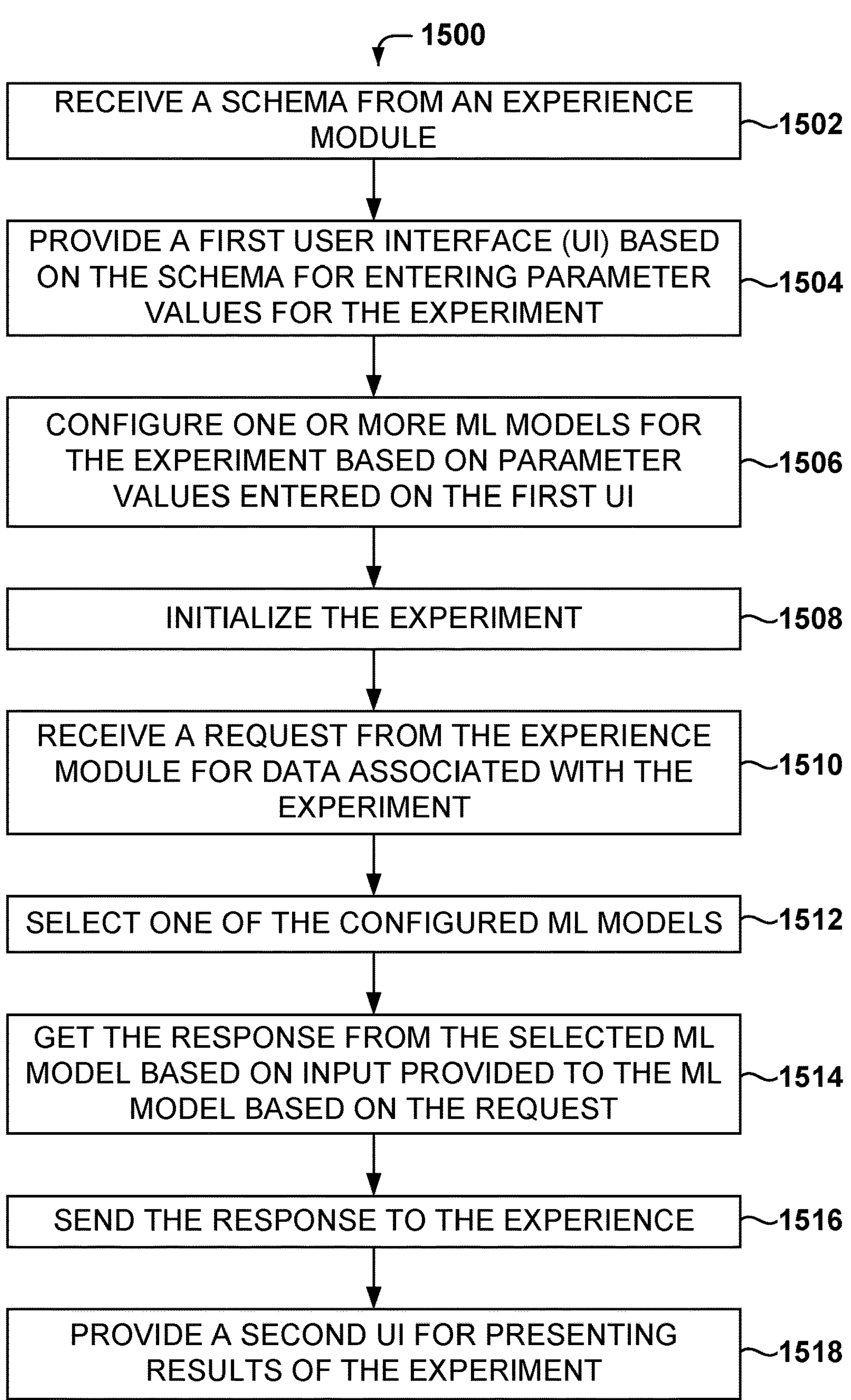
FIG. 15 is a flowchart of a method for implementing an artificial-intelligence modeling utility system, according to some example embodiments.

FIG. 15 is a flowchart of a method 1500 for implementing an artificial-intelligence modeling utility system, according to some example embodiments. While the various operations in this flowchart are presented and described sequentially, one of ordinary skill will appreciate that some or all of the operations may be executed in a different order, be combined or omitted, or be executed in parallel.

Operation 1502 is for receiving, by a modeling manager (e.g., AIMM 906), a schema from an experience component (e.g., experience 1106). The experience component implements one or more features of an online service, and the schema is a data structure that defines variables for an experiment. The modeling manager manages a plurality of machine-learning (ML) models.

From operation 1502, the method 1500 flows to operation 1504 to provide, by the modeling manager, a first user interface (UI) based on the schema for entering parameter values for the experiment.

From operation 1504, the method 1500 flows to operation 1506 for configuring one or more ML models from the plurality of ML models for the experiment based on parameter values entered on the first UI.

From operation 1506, the method 1500 flows to operation 1508 to initialize the experiment.

From operation 1508, the method 1500 flows to operation 1510 to, during the experiment, receive, by the modeling manager, a request from the experience component for data associated with the experiment.

From operation 1510, the method 1500 flows to operation 1512 for selecting, by the modeling manager, one of the configured ML models for providing a response to the request.

From operation 1512, the method 1500 flows to operation 1514 for getting the response from the selected ML model based on input provided to the ML model based on the request.

From operation 1514, the method 1500 flows to operation 1516 to send, by the modeling manager, the response to the experience.

From operation 1516, the method 1500 flows to operation 1518 to provide a second UI for presenting results of the experiment.

As an extension of the above-described methods, example embodiments can run multiple experiments or tests at the same time in which the experimental variants can be progressively chained for subgroups (also referred to as "sub-segments"). During the testing, the AIMM 906 can decide which variant of the experiment, if any, should be shown to a user.

Typically, the process to develop chained experiments is resource intensive. For example, a developer is required to engage with engineering to create and update sub-segments, add new sub-segments, and remove sub-segments of the audience to which the experiment will be applied. Additionally, creating these sub-segments can take days or weeks through code changes, reviews, experiment set-up, and so forth. Targeting and ramping variants (e.g., increasing a percentage of users to receive the variants) for each sub-segment also needs to be done through a different system, and integrating with an artificial intelligence (AI)-model requires a model to be built, integrated with a code base, and an AI infrastructure enabled.

In example embodiments, the AIMM 906 can be configured to provide test chaining capabilities using a visual, codeless approach that utilizes the straightforward user interfaces described above. Member segments (also referred to as "sub-segments") can be added, removed, or modified in order to serve a more personalize experience to each segment through chain testing. Each segment (segment level) is associated with a level of testing whereby each sub-segment (or lower segment level) has a set of one or more variants chained to a variant of a higher level segment.

When a request for an experience is received, the AIMM 906 determines which variant of the multiple levels of testing to provide to a user. In example embodiments, the AIMM 906 detects a lowest segment (e.g., lowest segment level) associated with the experience that the user is a member of A variant for the experience is then selected from one of a corresponding set of one or more variants of the lowest sub-segment, a chained variant of a parent segment, or the control value (also referred to as "control variant"). As used herein, "parent segment" refers to any segment of a higher level than a current segment. In some cases, the variant is selected using one of the AI models 912. The AIMM 906 transmits a response to the experience manager 908 that includes the selected variant. The experience manager 908 then causes presentation of the experience with the selected variant to the user.

In some cases, a user may be a member of more than one segment or sub-segment with conflicting experiments or customizations. In these cases, priorities assigned to the lowest segments that the user is a member of associated with the conflicting experiments or customizations are determined and the experiment/customization associated with a higher priority (e.g., a corresponding variant associated with the higher priority segment) may be presented. If a priority is not assigned to one or both of the lowest segments associated with the conflicting experiments or customizations, then the experiment/customization associated with a segment with a least number of members (e.g., a corresponding variant associated with the segment with least members) may be presented. For simplicity, customization (of the experience), testing, and experiment refer to the same process of determining a variant to present in an experience and can be used interchangeably.

A developer (e.g., tester) can independently ramp each variant to observe an impact of the variant before ramping higher or lower. For example, the developer can use a configuration UI (e.g., similar to configuration UI 402, 602, or 702) to establish each test including establishing a percentage of users assigned to receive each variant being tested (e.g., each sub-segment variant from a corresponding set of one or more variants of a sub-segment, each variant from a parent segment) and/or a control value. The experiment tracking system 1104 monitors for interactions with the experiences that include the different variants. Based on the monitoring, the percentages of users assigned to receive each variant can be ramped up (e.g., increased) or ramped down (e.g., decreased). In some cases, the ramping and targeting of variants can be determined by the developer. In other cases, the ramping and targeting of variants is automatically determined using the AI models 912.

Figure 16:
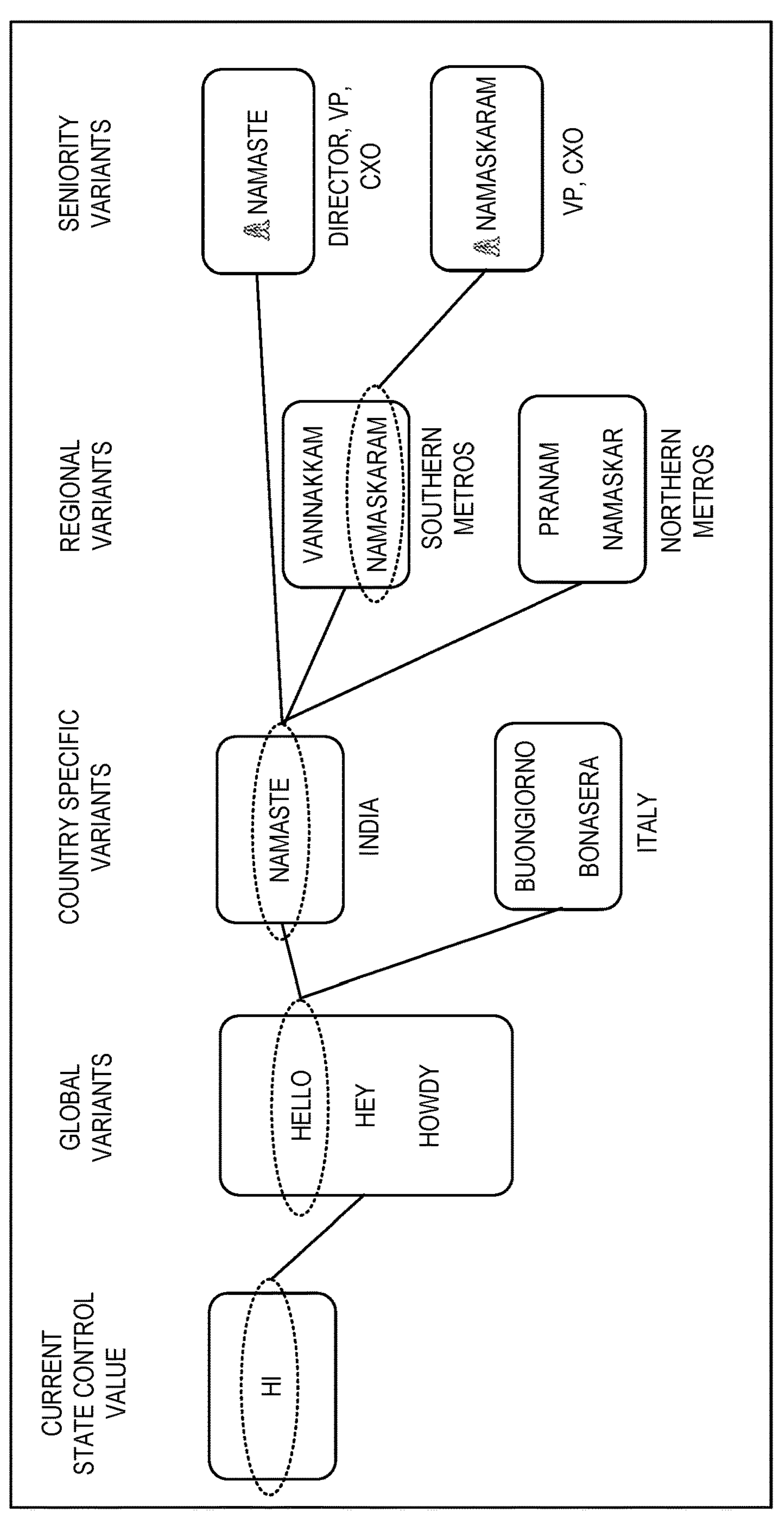
FIG. 16 illustrates an example of multi-level independently ramped chaining of variant tests, according to some example embodiments.

Referring now to FIG. 16, an example of multi-level independently ramped chaining of variant tests is shown. The example of FIG. 16 illustrates five levels of variant chaining to test email salutations at global, country, regional, and product levels. It is noted that chained variant testing can comprise any number of levels of testing and be directed to any experience provided by the social network server 1012. The testing of the different levels can be established using the above-described configuration UIs and the AIMM 906 is configured to manage the different levels seamlessly.

In this example, a first tester wants to test salutations presented in emails. A current standard salutation is "Hi" (e.g., current state control value). The first tester may be unsure in which country different variants of "Hi" will do better in. As such, the first tester may test three variants of "Hi" that include "Hello", "Hey", and "Howdy" globally. Thus, the first user ramps a global test up with global variants ("Hello", "Hey", and "Howdy") and a control value (or control variant) of "Hi". The global variants (e.g., segment variants) are chained to a variant of a higher level of testing. The chaining may be indicated by the first tester via the configuration UI. In this case, "Hello", "Hey", and "Howdy" are chained to "Hi." As a result, a user can receive a salutation of "Hello", "Hey", "Howdy", or "Hi" based on the output of the AI model used for the experience or based on random selection.

A second tester may be focused on a particular country, such as India, and wants to test a completely different variant for Indian users (e.g., an India segment). Conventionally, this cannot be done because a first test is already running (e.g., the global test) and conflicts may arise. However, example embodiments, allow for the chaining of variant tests. As such, the second tester can establish a country specific test for India with a country specific variant "Namaste". The country specific variant (e.g., segment variant) is chained to a variant of a higher level of testing. In this example, the second tester chains "Namaste" to "Hello." As a result, a user have a SegmentID associated with India can receive a salutation of "Namaste", "Hello", or "Hi" based on the output of the AI model used for the experience or based on random selection.

Similarly, a third tester may be focused on Italy and wants to test two Italian variants of "Hi". Here, the third tester wants to test segment variants of "Buongiorno" and "Bonasera". These two segment variants are also chained to the parent variant of "Hello" (of the parent global segment). Thus, a user have a SegmentID associated with Italy can receive a salutation of "Buongiorno", "Bonasera" "Hello", or "Hi" based on the output of the AI model used for the experience or based on random selection.

The second tester or further tester(s) may want to test regional variants for India. In this example, these tester(s) establish two sets of variants for regions of India (e.g., sub-segments of India)—one for Southern metros and one for Northern metros. Variants for the Southern Metros (e.g., sub-segment variants for Southern Metros) include "Vannakkam" and "Namaskaram", while variants for the Northern Metros (e.g., sub-segment variants for Northern Metros) include "Pranam" and "Namaskar". Both sets of sub-segment variants are chained to the parent variant of "Namaste" (of the parent India segment). Thus, a user have a SegmentID associated with the Southern Metros (e.g., is a member of the Southern Metros sub-segment) can receive a salutation of "Vannakkam", "Namaskaram", "Namaste", "Hello", or "Hi" based on the output of the AI model used for the experience or based on random selection. Similarly, a user have a SegmentID associated with the Northern Metros (e.g., is a member of the Northern Metros sub-segment) can receive a salutation of "Pranam", "Namaskar", "Namaste", "Hello", or "Hi" based on the output of the AI model used for the experience or based on random selection.

In a further chain test, a tester wants to test a seniority variant for users in India. Here, the tester wants to test adding a "Namaste emoji" for senior executives both at a country level and a regional level. For the country level, the sub-segment variant is chained to the parent variant of "Namaste" (of the parent India segment), while at the regional level, the sub-segment variant is chained to a parent variant of "Namaskaram" (of the parent Southern Metros segment). Thus, for example, a vice-president (VP) or chief experience officer (CXO) with a SegmentID (e.g., is a member of the sub-segment) associated with senior executives located in the Southern Metros of India can receive a salutation of "Namaskaram" with an emoji, "Namaskaram", "Namaste", "Hello", or "Hi" based on the output of the AI model used for the experience or based on random selection. In contrast, a director, VP, or CXO with a SegmentID associated with senior executives located in India can receive a salutation of "Namaste" with an emoji, "Namaste", "Hello", or "Hi" based on the output of the AI model used for the experience or based on random selection.

As illustrated by the example of FIG. 16, each SegmentID can be broken into a lower segment (sub-segments) to an arbitrary number of levels. For instance, the global segment is segmented by country (e.g., Italy and India). India is segmented by region (e.g., Southern Metros and Northern Metros). The Northern Metros can be segmented by intent (e.g., hiring managers and job seekers), and job seekers, for example, can be segmented by seniority (e.g., CXOs, VPs) or industry (e.g., technology, business). As such, a tester can link experimental variants at each or any level to progressively optimize/customize the experience for a newly identified sub-segment. Furthermore, the variants can be manually determined by the testers or be generated using AI (e.g., AI models).

Figure 17:
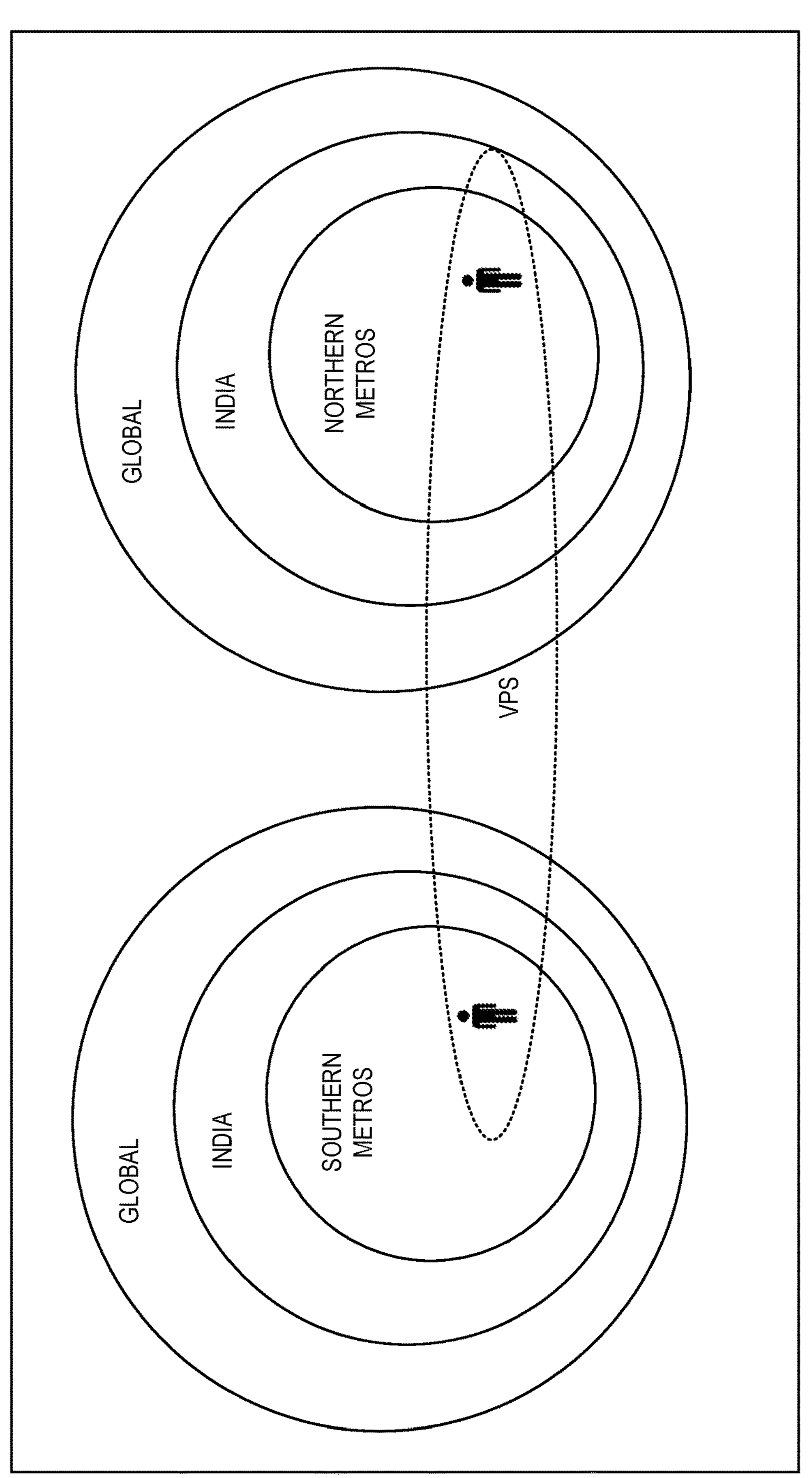
FIG. 17 illustrates an example of chaining across different parent segments, according to some example embodiments.

In some embodiments, chaining can be applied across different parent segments by the AIMM 906 using the codeless user interfaces discussed above. Referring now to FIG. 17, an example of chaining across different parent segments is shown. In this example, VP segments in both Southern Metros and Northern Metros (parent segments) can receive the same variants (and have the same experiment applied to them) by chaining their respective VP segments together.

Figure 18:
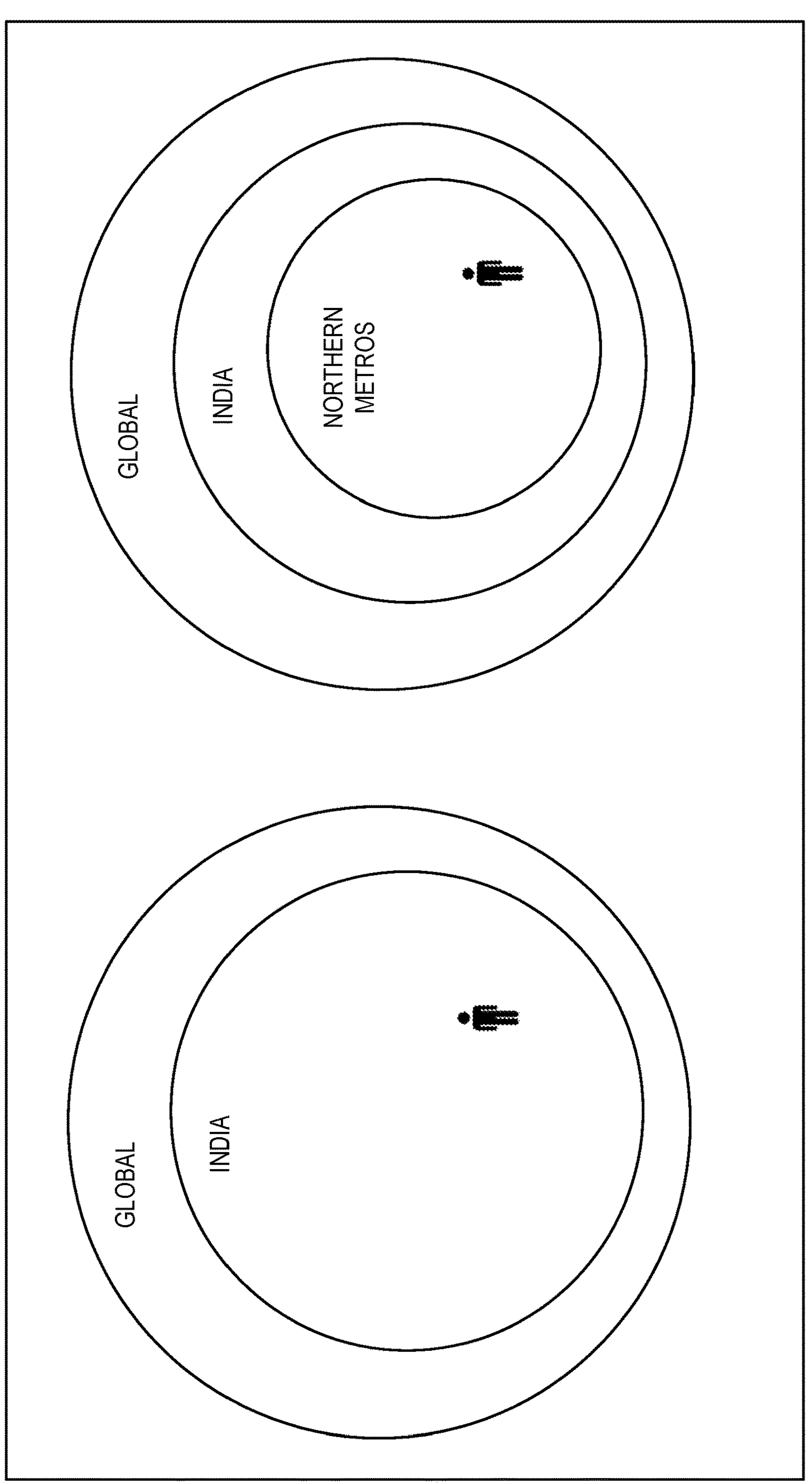
FIG. 18 illustrates an example of chaining a new test, according to some example embodiments.

In example embodiments, the codeless user interfaces associated with the AIMM 906 can be used to add or remove each chained test autonomously. Thus, new tests can be create with a set of one or more variants for a new identified/created sub-segment and chained to another test. Referring to FIG. 18, an example of chaining a new test and thus a new segment is shown. Here, a new segment of Northern Metros is created within the India segment. With the creation of the Northern Metros segment, a corresponding set of one or more variants are created (manually or with AI model). The corresponding set can then be chained to a variant (or control value) or a parent segment. As a result, members of the Northern Metros segment can now receive a variant based on a test established for the Northern Metros segment.

Figure 19:
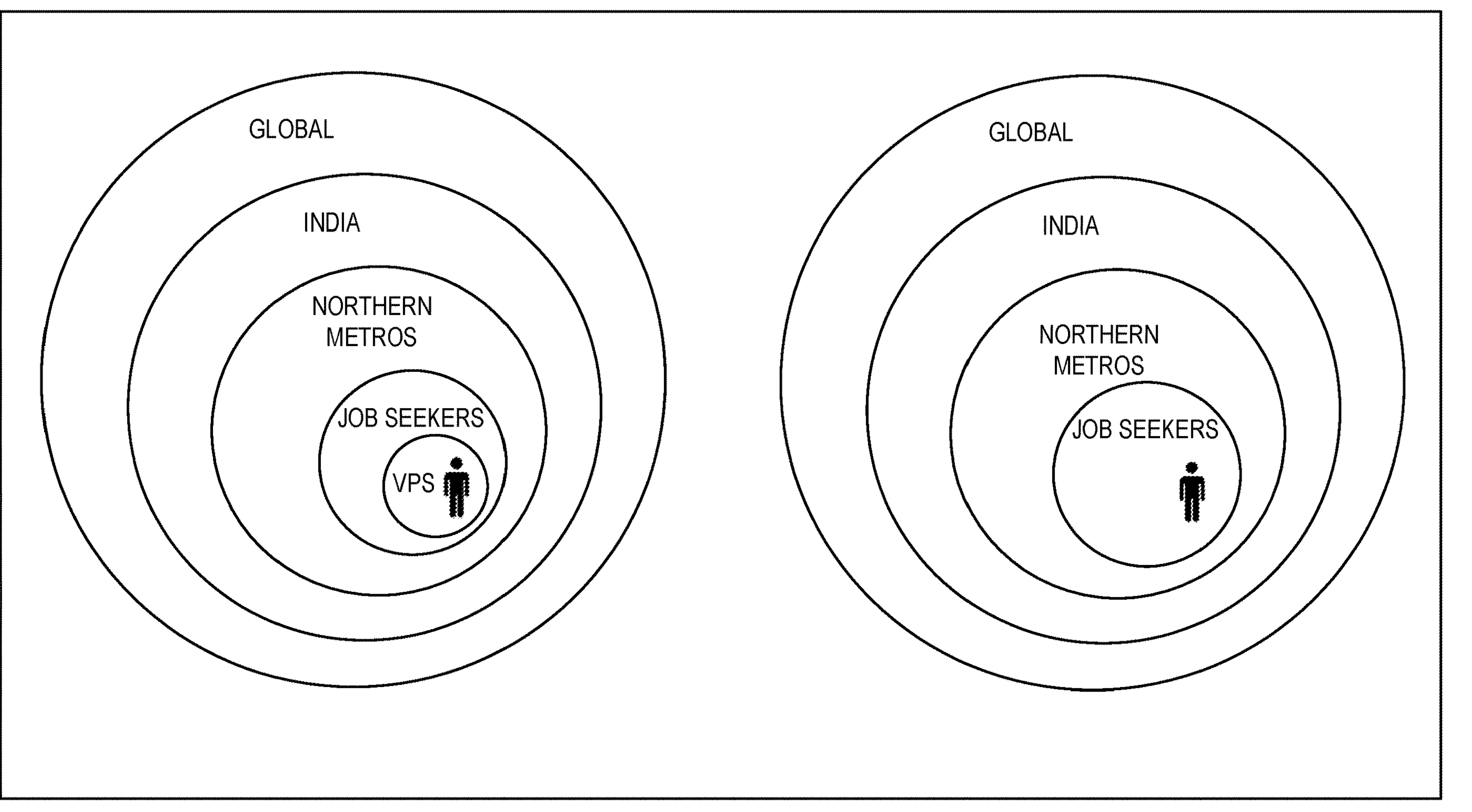
FIG. 19 illustrates removal of a test from a test chain, according to some example embodiments.

Conversely, a test chain can be easily removed. As shown in FIG. 19, an original test chain include a VP segment that are job seekers. This lowest segment can be removed by the AIMM 906 resulting in previous members of the VP segment falling into the parent segment of job seekers. As a result, the previous members of the VP segment can now receive a variant based on a test established for the job-seeker segment.

FIG. 20 is a flowchart illustrating operations of an example method 2000 for presenting an experience based on chained testing, according to example embodiments. Operations in the method 2000 may be performed by the social networking server 1012, using components described above with respect to, for example, FIG. 11. Accordingly, the method 2000 is described by way of example with reference to the social networking server 1012. However, it shall be appreciated that at least some of the operations of the method 2000 may be deployed on various other hardware configurations or be performed by similar components residing elsewhere in a network environment. Therefore, the method 2000 is not intended to be limited to the social networking server 1012.

In operation 2002, the AIMM 906 receives a request for data associated with an experience to be presented to a user. The experience may comprise multiple levels of testing (or customization) of the experience where each lower level of testing has a set of one or more variants chained to a variant of a higher level. In some cases, the variant at the higher level may be a control value/variant. For example, the request may be an email experience whereby content for the email may be customized.

Based on the request, the AIMM 906 determines which variant of the multiple levels of testing should be provided to the user. In operation 2004, the AIMM 906 identifies one or more segments that a user is a member of A user may belong to several segments (or sub-segments) simultaneously. For example, a user may be a member of a specific intent, geography, industry, demography, seniority, and so on. For instance, a user that is a software engineers in Munich, Germany looking for a job belongs to segments including job seeker (intent segment), Germany (geography segment), Munich (regional segment), and technology (industry segment).

In operation 2006, a determination is made by the AIMM 906 whether there is a conflict in the testing/customization of the experience. As used herein, testing and customization are used interchangeably and can mean the same thing. In some cases, the segments that a user is a member of partially or fully overlap in terms of the customization of the experience they should receive. For example, the experience may be tested/customized in three different ways. A first customization can be for job seekers in Munich regarding a Munich job fair. A second customization can be for job seekers in Germany. A third customization can be for software engineers in general. Since the user is a member of all of these segments, there is a conflict. If a conflict is detected in operation 2006, then the method 2000 continues to operations of a method 2100 shown in FIG. 21.

However, if there is no conflict, then the method 2000 proceeds to operation 2008 where a variant is selected. In some embodiments, the AI models 912 determines the variant to return with the experience. In other embodiments, the variant can be randomly selected. In determining the variant to return, the AIMM 906 detects a lowest sub-segment the user is a member. The AIMM 906 then selects the variant from one of a corresponding set of one or more variants of the lowest sub-segment, a chained variant of a parent segment, or a control value. The selecting of the variant is based, in part, on a percentage of users assigned to receive each variant.

In operation 2010, the experience with the selected variant is presented to the user. In example embodiments, the AIMM 906 transmits a response to the experience component that includes the selected variant. The experience component then causes the presentation of the experience with the selected variant.

Figure 21:
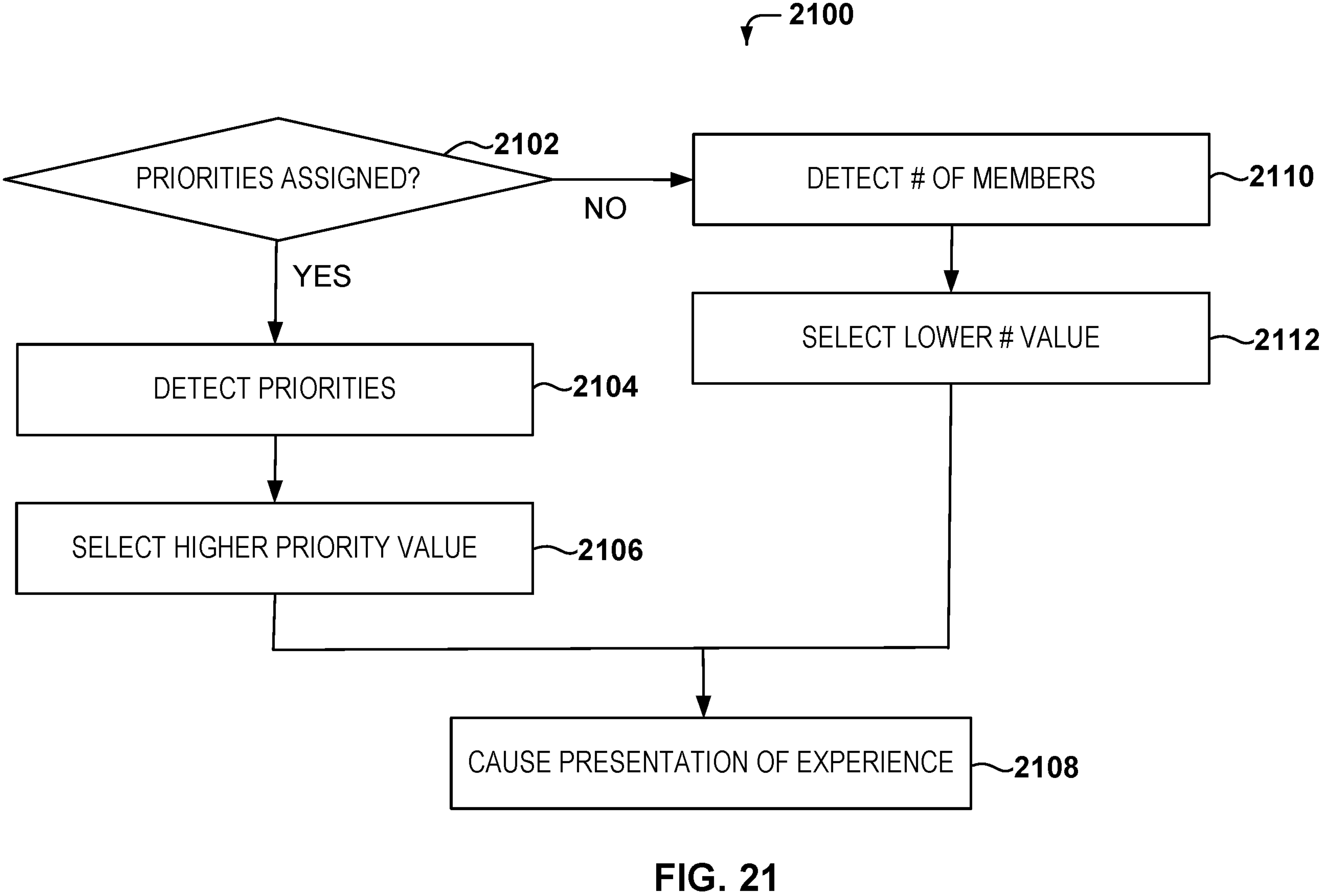
FIG. 21 is a flowchart illustrating operations of a method for presenting an experience that has conflicting customizations, according to example embodiments.

FIG. 21 is a flowchart illustrating operations of an example method 2100 for presenting an experience that has conflicting customizations, according to example embodiments. Operations in the method 2100 may be performed by the social networking server 1012, using components described above with respect to, for example, FIG. 11. Accordingly, the method 2100 is described by way of example with reference to the social networking server 1012. However, it shall be appreciated that at least some of the operations of the method 2100 may be deployed on various other hardware configurations or be performed by similar components residing elsewhere in a network environment. Therefore, the method 2100 is not intended to be limited to the social networking server 1012.

In operation 2102, a determination is made whether priorities are assigned to the segments involved in the conflict. Each segment is assigned two key attributes. The first attribute is a segment size, which is a total number of members in the segment (e.g., global segment=800M members; India segment=100M members; Southern Metros segment=50M members). The second attribute is a segment priority relate to all other known segments (e.g., Munich jobseeker segment=priority 5; Germany jobseeker segment=priority 12; Munich=9; software engineers=priority 15).

If priorities are assigned to the segments, then in operation 2104, the priorities are detected. Returning to the Germany, software engineer, job seeker example, the priority for Munich job seekers is higher than priority for German job seekers or software engineers.

In operation 2106, a variant associated with the highest priority segment is selected. Continuing with the example, the variant can be a message to the user regarding a Munich job fair (as opposed to a message to German job seekers or a message to software engineers in general).

In operation 2108, the experience with the selected variant is presented to the user. In example embodiments, the AIMM 906 transmits a response to the experience component that includes the selected variant (e.g., the message regarding the Munich job fair). The experience component then causes the presentation of the experience with the selected variant.

However, if a determination is made that priorities are not assigned to all of the segments in operation 2102, then the AIMM 906 detects, in operation 2110, a number of members in each segment (e.g., Germany, Munich, Munich job seekers, software engineers in general). For example, a segment or segment type may be new and not yet assigned a priority.

In operation 2112, a variant associated with the segment having the lower number of members is selected. Assuming that not all segments associated with the Munich jobseeker example has an assigned priority, the AIMM 906 defaults to detecting the number of members in the associated segments. With this example, Munich jobseekers will have the lowest number of members. Thus, the variant selected is the message regarding the Munich job fair. The experience with the selected variant is presented to the user in operation 2108.

Figure 22:
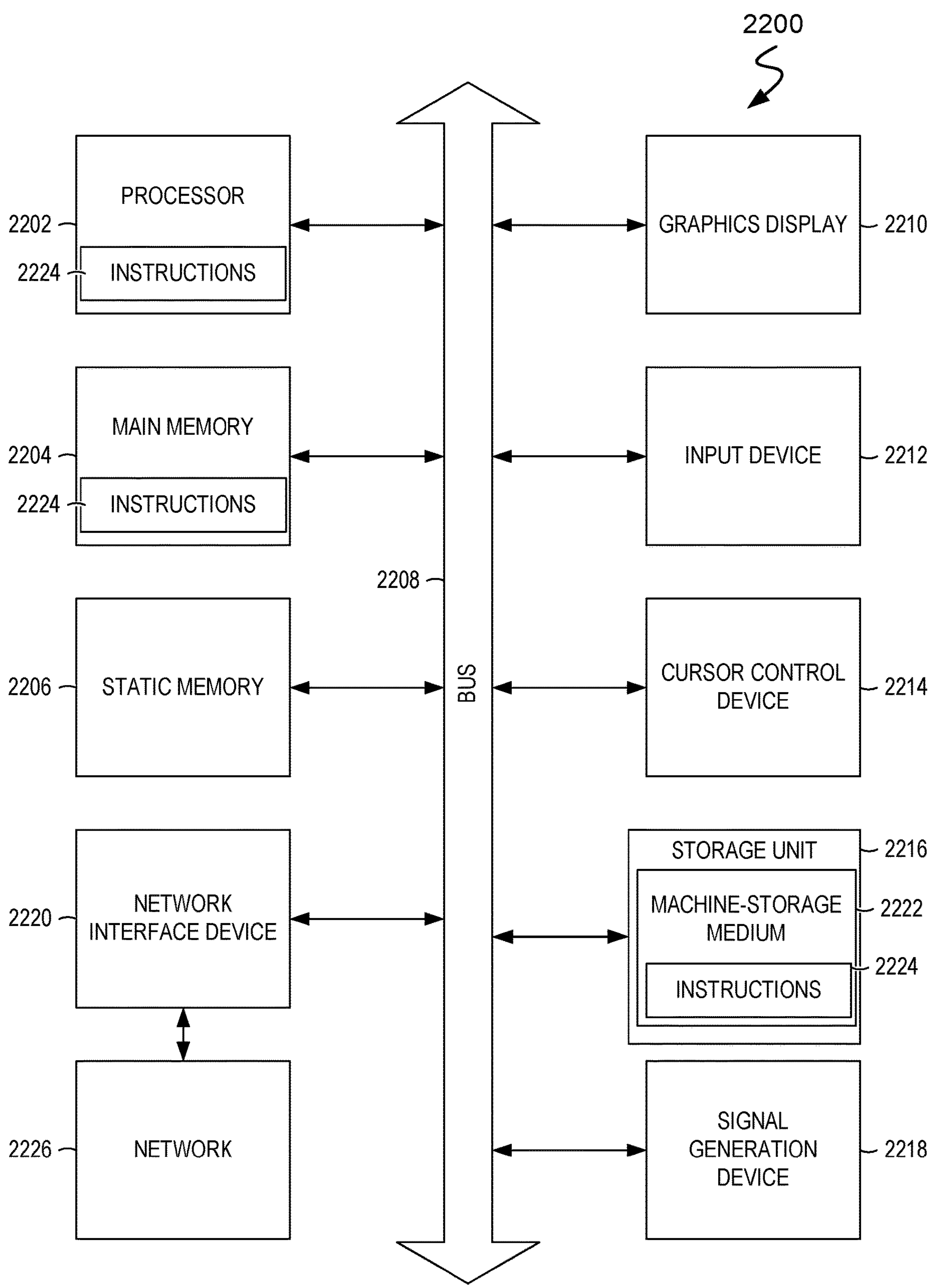
FIG. 22 is a block diagram illustrating an example of a machine upon or by which one or more example process embodiments described herein may be implemented or controlled.

FIG. 22 illustrates components of a machine 2200, according to some example embodiments, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 22 shows a diagrammatic representation of the machine 2200 in the example form of a computer device (e.g., a computer) and within which instructions 2224 (e.g., software, a program, an application, an applet, an app, or other executable code) for causing the machine 2200 to perform any one or more of the methodologies discussed herein may be executed, in whole or in part.

For example, the instructions 2224 may cause the machine 2200 to execute the flow diagrams of FIGS. 12-15, 20, and 21. In one embodiment, the instructions 2224 can transform the machine 2200 into a particular machine (e.g., specially configured machine) programmed to carry out the described and illustrated functions in the manner described.

In alternative embodiments, the machine 2200 operates as a standalone device or may be connected (e.g., networked) to other machines. In a networked deployment, the machine 2200 may operate in the capacity of a server machine or a client machine in a server-client network environment, or as a peer machine in a peer-to-peer (or distributed) network environment. The machine 2200 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 2224 (sequentially or otherwise) that specify actions to be taken by that machine. Further, while only a single machine is illustrated, the term "machine" shall also be taken to include a collection of machines that individually or jointly execute the instructions 2224 to perform any one or more of the methodologies discussed herein.

The machine 2200 includes a processor 2202 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 2204, and a static memory 2206, which are configured to communicate with each other via a bus 2208. The processor 2202 may contain microcircuits that are configurable, temporarily or permanently, by some or all of the instructions 2224 such that the processor 2202 is configurable to perform any one or more of the methodologies described herein, in whole or in part. For example, a set of one or more microcircuits of the processor 2202 may be configurable to execute one or more components described herein.

The machine 2200 may further include a graphics display 2210 (e.g., a plasma display panel (PDP), a light emitting diode (LED) display, a liquid crystal display (LCD), a projector, or a cathode ray tube (CRT), or any other display capable of displaying graphics or video). The machine 2200 may also include an input device 2212 (e.g., a keyboard), a cursor control device 2214 (e.g., a mouse, a touchpad, a trackball, a joystick, a motion sensor, or other pointing instrument), a storage unit 2216, a signal generation device 2218 (e.g., a sound card, an amplifier, a speaker, a headphone jack, or any suitable combination thereof), and a network interface device 2220.

The storage unit 2216 includes a machine-storage medium 2222 (e.g., a tangible machine-storage medium) on which is stored the instructions 2224 (e.g., software) embodying any one or more of the methodologies or functions described herein. The instructions 2224 may also reside, completely or at least partially, within the main memory 2204, within the processor 2202 (e.g., within the processor's cache memory), or both, before or during execution thereof by the machine 2200. Accordingly, the main memory 2204 and the processor 2202 may be considered as machine-storage media (e.g., tangible and non-transitory machine-storage media). The instructions 2224 may be transmitted or received over a network 2226 via the network interface device 2220.

In some example embodiments, the machine 2200 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the components described herein.

Executable Instructions and Machine-Storage Medium

The various memories (e.g., 2204, 2206, and/or memory of the processor(s) 2202) and/or storage unit 2216 may store one or more sets of instructions and data structures (e.g., software) 2224 embodying or utilized by any one or more of the methodologies or functions described herein. These instructions, when executed by processor(s) 2202 cause various operations to implement the disclosed embodiments.

As used herein, the terms "machine-storage medium," "device-storage medium," "computer-storage medium" (referred to collectively as "machine-storage medium 2222") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 2222 include non-volatile memory, including by way of example semiconductor memory devices, for example, erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium or media, computer-storage medium or media, and device-storage medium or media 2222 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 2224 may further be transmitted or received over a communications network 2226 using a transmission medium via the network interface device 2220 and utilizing any one of a number of well-known transfer protocols (e.g., TCP/IP). Examples of communication networks 2226 include a local area network (LAN), a wide area network (WAN), the Internet, mobile telephone networks, plain old telephone service (POTS) networks, and wireless data networks (e.g., Wi-Fi, LTE, and WiMAX networks). The term "transmission medium" shall be taken to include any intangible medium that is capable of storing, encoding, or carrying instructions 2224 for execution by the machine 2200, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

In some embodiments, a hardware component may be implemented mechanically, electronically, or any suitable combination thereof. For example, a hardware component may include dedicated circuitry or logic that is permanently configured to perform certain operations. For example, a hardware component may be a special-purpose processor, such as a field programmable gate array (FPGA) or an ASIC. A hardware component may also include programmable logic or circuitry that is temporarily configured by software to perform certain operations. For example, a hardware component may include software encompassed within a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations.

Accordingly, the term "hardware component" should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where the hardware component comprises a general-purpose processor configured by software to become a special-purpose processor, the general-purpose processor may be configured as respectively different special-purpose processors (e.g., comprising different hardware components) at different times. Software may accordingly configure a processor, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors.

Similarly, the methods described herein may be at least partially processor-implemented, a processor being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented components may be located in a single geographic location (e.g., within a home environment, an office environment, or a server farm). In other example embodiments, the one or more processors or processor-implemented components may be distributed across a number of geographic locations.

EXAMPLES

Example 1 is a method for providing multilevel chained testing. The method comprises receiving, by a modeling manager from an experience component, a request for data associated with an experience having multiple levels of testing, each lower level of testing having a set of one or more variants chained to a variant of a higher level of testing; based on the request, determining which variant of the multiple levels of testing to provide to a user, the determining comprising detecting a lowest segment associated with the experience the user is a member of, each segment level corresponding to a level of testing and selecting a variant from one of a corresponding set of one or more variants of the lowest segment, a chained variant of a parent segment, or a control value; transmitting, by the modeling manager, a response to the experience component that includes the selected variant; and causing presentation, by the experience component, of the experience with the selected variant to the user.

In example 2, the subject matter of example 1 can optionally include adding a next level of testing to the experience that is at a lower level than any existing levels of testing, the adding comprising causing select members of a segment corresponding to a previous lowest level of the testing to be added to a next segment corresponding to the next level of testing; and chaining a further set of one or more variants associated with the next segment to a variant of a parent segment.

In example 3, the subject matter of any of examples 1-2 can optionally include removing a lowest level of testing from the multiple levels of testing, the removing causing members of the segment corresponding to the lowest level of testing to fall into an immediate parent segment.

In example 4, the subject matter of any of examples 1-3 can optionally include wherein selecting the variant comprises selecting is based in part on users assigned to receive each of the one or more variants of the lowest segment.

In example 5, the subject matter of any of examples 1-4 can optionally include chaining lower-level segments across different parent segments, wherein the lowest segment of the user is part of the chained lowest-level segments.

In example 6, the subject matter of any of examples 1-5 can optionally include monitoring, by an experiment tracking system, for an interaction with the experience having the selected variant.

In example 7, the subject matter of any of examples 1-6 can optionally include, based on the monitoring, increasing or decreasing a percentage of users assigned to receive each variant from the corresponding set of one or more variants of the lowest segment.

In example 8, the subject matter of any of examples 1-7 can optionally include detecting a conflict between presenting the experience based on variants associated with the lowest segment and presenting the experience base on variants associated with a second segment the user also is a member of; determining a priority assigned to the lowest segment and a priority assigned to the second segment; and causing presentation of the experience based on the variants associated with a higher priority, the experience associated with the lowest segment having the higher priority.

In example 9, the subject matter of any of examples 1-8 can optionally include detecting a conflict between presenting the experience based on variants associated with the lowest segment and the experience based on variants associated with a second segment the user also is a member of; determining that a priority is not assigned to the lowest segment or the second segment; and causing presentation of the experience based on the variants associated with a segment with a least number of members, the experience associated with the lowest segment having the least number of members.

In example 10, the subject matter of any of examples 1-9 can optionally include wherein selecting the variant comprises using a machine learning model to select the variant.

Example 11 is a system for providing multilevel chained testing. The system comprises one or more processors and a memory storing instructions that, when executed by the one or more processors, cause the one or more processors to perform operations comprising receiving, by a modeling manager from an experience component, a request for data associated with an experience having multiple levels of testing, each lower level of testing having a set of one or more variants chained to a variant of a higher level of testing; based on the request, determining which variant of the multiple levels of testing to provide to a user, the determining comprising detecting a lowest segment associated with the experience the user is a member of, each segment level corresponding to a level of testing and selecting a variant from one of a corresponding set of one or more variants of the lowest segment, a chained variant of a parent segment, or a control value; transmitting, by the modeling manager, a response to the experience component that includes the selected variant; and causing presentation, by the experience component, of the experience with the selected variant to the user.

In example 12, the subject matter of example 11 can optionally include wherein the operations further comprise adding a next level of testing to the experience that is at a lower level than any existing levels of testing, the adding comprising causing select members of a segment corresponding to a previous lowest level of testing to be added to a next segment corresponding to the next level of testing; and chaining a further set of one or more variants associated with the next segment to a variant of a parent segment.

In example 13, the subject matter of any of examples 11-12 can optionally include wherein the operations further comprise removing a lowest level of testing from the multiple levels of testing, the removing causing members of the segment corresponding to the lowest level of testing to fall into an immediate parent segment.

In example 14, the subject matter of any of examples 11-13 can optionally include wherein selecting the variant is based in part on a percentage of users assigned to receive each of the one or more variants of the lowest segment.

In example 15, the subject matter of any of examples 11-14 can optionally include wherein the operations further comprise chaining lower-level segments across different parent segments, wherein the lowest segment of the user is part of the chained lower-level segments.

In example 16, the subject matter of any of examples 11-15 can optionally include wherein the operations further comprise monitoring, by an experiment tracking system, for an interaction with the experience having the selected variant.

In example 17, the subject matter of any of examples 11-16 can optionally include wherein the operations further comprise based on the monitoring, increasing or decreasing a percentage of users assigned to receive each variant from the corresponding set of one or more variants of the lowest segment.

In example 18, the subject matter of any of examples 11-17 can optionally include wherein the operations further comprise detecting a conflict between presenting the experience based on variants associated with the lowest segment and presenting the experience based on variants associated with a second segment the user also is a member of, determining a priority assigned to the lowest segment and a priority assigned to the second segment; and causing presentation of the experience based on the variants associated with a higher priority, the experience associated with the lowest segment having the higher priority.

In example 19, the subject matter of any of examples 11-18 can optionally include wherein the operations further comprise detecting a conflict between presenting the experience based on variants associated with the lowest segment and the experience based on variants associated with a second segment the user also is a member of, determining that a priority is not assigned to the lowest segment or the second segment; and causing presentation of the experience based on the variants associated with a segment with a least number of members, the experience associated with the lowest segment having the least number of members Example 20 is a computer-storage medium comprising instructions which, when executed by one or more processors of a machine, cause the machine to perform operations for providing multilevel chained testing. The operations comprise receiving, by a modeling manager from an experience component, a request for data associated with an experience having multiple levels of testing, each lower level of testing having a set of one or more variants chained to a variant of a higher level of testing; based on the request, determining which variant of the multiple levels of testing to provide to a user, the determining comprising detecting a lowest segment associated with the experience the user is a member of, each segment level corresponding to a level of testing and selecting a variant from one of a corresponding set of one or more variants of the lowest segment, a chained variant of a parent segment, or a control value; transmitting, by the modeling manager, a response to the experience component that includes the selected variant; and causing presentation, by the experience component, of the experience with the selected variant to the user.

The techniques described herein may be implemented with privacy safeguards to protect user privacy. Furthermore, the techniques described herein may be implemented with user privacy safeguards to prevent unauthorized access to personal data and confidential data. The training of the AI models described herein is executed to benefit all users fairly, without causing or amplifying unfair bias.

According to some embodiments, the techniques for the models described herein do not make inferences or predictions about individuals unless requested to do so through an input. According to some embodiments, the models described herein do not learn from and are not trained on user data without user authorization. In instances where user data is permitted and authorized for use in AI features and tools, it is done in compliance with a user's visibility settings, privacy choices, user agreement and descriptions, and the applicable law. According to the techniques described herein, users may have full control over the visibility of their content and who sees their content, as is controlled via the visibility settings. According to the techniques described herein, users may have full control over the level of their personal data that is shared and distributed between different AI platforms that provide different functionalities. According to the techniques described herein, users may have full control over the level of access to their personal data that is shared with other parties. According to the techniques described herein, personal data provided by users may be processed to determine prompts when using a generative AI feature at the request of the user, but not to train generative AI models. In some embodiments, users may provide feedback while using the techniques described herein, which may be used to improve or modify the platform and products. In some embodiments, any personal data associated with a user, such as personal information provided by the user to the platform, may be deleted from storage upon user request. In some embodiments, personal information associated with a user may be permanently deleted from storage when a user deletes their account from the platform.

According to the techniques described herein, personal data may be removed from any training dataset that is used to train AI models. The techniques described herein may utilize tools for anonymizing member and customer data. For example, user's personal data may be redacted and minimized in training datasets for training AI models through delexicalisation tools and other privacy enhancing tools for safeguarding user data. The techniques described herein may minimize use of any personal data in training AI models, including removing and replacing personal data. According to the techniques described herein, notices may be communicated to users to inform how their data is being used and users are provided controls to opt-out from their data being used for training AI models.

According to some embodiments, tools are used with the techniques described herein to identify and mitigate risks associated with AI in all products and AI systems. In some embodiments, notices may be provided to users when AI tools are being used to provide features.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific examples, various modifications and changes may be made to these examples without departing from the broader scope of examples of the present invention. For instance, various examples or features thereof may be mixed and matched or made optional by a person of ordinary skill in the art. Such examples of the present subject matter may be referred to herein, individually or collectively, by the term "invention" merely for convenience and without intending to voluntarily limit the scope of this application to any single invention or present concept if more than one is, in fact, disclosed.

The examples illustrated herein are believed to be described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various examples of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of examples of the present invention as represented by the appended claims. The specification and drawings are, accordingly, to be regarded in an illustrative rather than a restrictive sense.

The invention claimed is:

1. A method comprising:

receiving, by a modeling manager from an experience component, a request for data associated with an experience having multiple levels of testing, each lower level of testing having a set of one or more variants chained to a variant of a higher level of testing;

based on the request, determining which variant of the multiple levels of testing to provide to a user, the determining comprising:

detecting a lowest segment associated with the experience the user is a member of, each segment level corresponding to a level of testing;

selecting a variant from one of a corresponding set of one or more variants of the lowest segment, a chained variant of a parent segment, or a control value, the selecting comprising using the modeling manager to concurrently execute a plurality of models targeted at different sets of users, evaluating a performance of each of the concurrently executed models, and selecting a model of the plurality of models based on the evaluated performance; and removing a lowest level of testing from the multiple levels of testing, wherein members of a segment corresponding to the lowest level of testing are removed to fall into an immediate parent segment;

transmitting, by the modeling manager, a response to the experience component that includes the selected variant; and causing presentation, by the experience component, of the experience with the selected variant to the user.

2. The method of claim 1, further comprising:

adding a next level of testing to the experience that is at a lower level than any existing levels of testing, the adding comprising:

selecting members of a segment corresponding to a previous lowest level of testing to be added to a next segment corresponding to the next level of testing; and chaining a further set of one or more variants associated with the next segment to a variant of the parent segment.

3. The method of claim 1, wherein selecting the variant is based in part on a percentage of users assigned to receive each of the one or more variants of the lowest segment.

4. The method of claim 1, further comprising:

chaining lower-level segments across different parent segments, wherein the lowest segment of the user is part of the chained lower-level segments.

5. The method of claim 1, further comprising:

monitoring, by an experiment tracking system, for an interaction with the experience having the selected variant.

6. The method of claim 5, further comprising:

based on the monitoring, increasing or decreasing a percentage of users assigned to receive each variant from the corresponding set of one or more variants of the lowest segment.

7. The method of claim 1, further comprising:

detecting a conflict between presenting the experience based on the variants associated with the lowest segment and presenting the experience based on variants associated with a second segment the user also is a member of;

determining a priority assigned to the lowest segment and a priority assigned to the second segment; and causing presentation of the experience based on the variants associated with a higher priority, the experience associated with the lowest segment having the higher priority.

8. The method of claim 1, further comprising:

detecting a conflict between presenting the experience based on the variants associated with the lowest segment and the experience based on variants associated with a second segment the user also is a member of;

determining that a priority is not assigned to the lowest segment or the second segment; and causing presentation of the experience based on the variants associated with a segment with a least number of members, the experience associated with the lowest segment having the least number of members.

9. A system comprising:

one or more processors; and a memory storing instructions that, when executed by the one or more processors, cause the one or more processors to perform operations comprising:

receiving, by a modeling manager from an experience component, a request for data associated with an experience having multiple levels of testing, each lower level of testing having a set of one or more variants chained to a variant of a higher level of testing;

based on the request, determining which variant of the multiple levels of testing to provide to a user, the determining comprising:

detecting a lowest segment associated with the experience the user is a member of, each segment level corresponding to a level of testing;

selecting a variant from one of a corresponding set of one or more variants of the lowest segment, a chained variant of a parent segment, or a control value, the selecting comprising using the modeling manager to concurrently execute a plurality of models targeted at different sets of users, evaluating a performance of each of the concurrently executed models, and selecting a model of the plurality of models based on the evaluated performance; and removing a lowest level of testing from the multiple levels of testing, wherein members of a segment corresponding to the lowest level of testing are removed to fall into an immediate parent segment;

transmitting, by the modeling manager, a response to the experience component that includes the selected variant; and causing presentation, by the experience component, of the experience with the selected variant to the user.

10. The system of claim 9, wherein the operations further comprise:

adding a next level of testing to the experience that is at a lower level than any existing levels of testing, the adding comprising:

selecting members of a segment corresponding to a previous lowest level of testing to be added to a next segment corresponding to the next level of testing; and chaining a further set of one or more variants associated with the next segment to a variant of a parent segment.

11. The system of claim 9, wherein selecting the variant is based in part on a percentage of users assigned to receive each of the one or more variants of the lowest segments.

12. The system of claim 9, wherein the operations further comprise:

chaining lower-level segments across different parent segments, wherein the lowest segment of the user is part of the chained lower-level segments.

13. The system of claim 9, wherein the operations further comprise:

monitoring, by an experiment tracking system, for an interaction with the experience having the selected variant.

14. The system of claim 13, wherein the operations further comprise:

based on the monitoring, increasing or decreasing a percentage of users assigned to receive each variant from the corresponding set of one or more variants of the lowest segment.

15. The system of claim 9, wherein the operations further comprise:

detecting a conflict between presenting the experience based on the variants associated with the lowest segment and presenting the experience based on variants associated with a second segment the user also is a member of;

determining a priority assigned to the lowest segment and a priority assigned to the second segment; and causing presentation of the experience based on the variants associated with a higher priority, the experience associated with the lowest segment having the higher priority.

16. The system of claim 9, wherein the operations further comprise:

detecting a conflict between presenting the experience based on the variants associated with the lowest segment and the experience based on variants associated with a second segment the user also is a member of;

determining that a priority is not assigned to the lowest segment or the second segment; and causing presentation of the experience based on the variant associated with a segment with a least number of members, the experience associated with the lowest segment having the least number of members.

17. A machine-storage medium comprising instructions which, when executed by one or more processors of a machine, cause the machine to perform operations comprising:

receiving, by a modeling manager from an experience component, a request for data associated with an experience having multiple levels of testing, each lower level of testing having a set of one or more variants chained to a variant of a higher level of testing;

based on the request, determining which variant of the multiple levels of testing to provide to a user, the determining comprising:

detecting a lowest segment associated with the experience the user is a member of, each segment level corresponding to a level of testing;

selecting a variant from one of a corresponding set of one or more variants of the lowest segment, a chained variant of a parent segment, or a control value, the selecting comprising using the modeling manager to concurrently execute a plurality of models targeted at different sets of users, evaluating a performance of each of the concurrently executed models, and selecting a model of the plurality of models based on the evaluated performance; and removing a lowest level of testing from the multiple levels of testing, wherein members of a segment corresponding to the lowest level of testing are removed to fall into an immediate parent segment;

transmitting, by the modeling manager, a response to the experience component that includes the selected variant; and causing presentation, by the experience component, of the experience with the selected variant to the user.

* * * * *